(12) United States Patent
Srinivasan et al.

(10) Patent No.: US 7,200,275 B2
(45) Date of Patent: Apr. 3, 2007

(54) SKIP MACROBLOCK CODING

(75) Inventors: Sridhar Srinivasan, Seattle, WA (US); Pohsiang Hsu, Redmond, WA (US)

(73) Assignee: Microsoft Corporation, Remond, WA (US)

( * ) Notice: Subject to any disclaimer, the term of this patent is extended or adjusted under 35 U.S.C. 154(b) by 739 days.

(21) Appl. No.: 10/321,415

(22) Filed: Dec. 16, 2002

(65) Prior Publication Data

US 2003/0113026 A1 Jun. 19, 2003

Related U.S. Application Data

(60) Provisional application No. 60/377,712, filed on May 3, 2002, provisional application No. 60/341,674, filed on Dec. 17, 2001.

(51) Int. Cl.
G06K 9/36 (2006.01)
G06K 9/46 (2006.01)

(52) U.S. Cl. ............. 382/239; 382/244; 382/236; 382/238

(58) Field of Classification Search ............. 382/239
See application file for complete search history.

(56) References Cited

U.S. PATENT DOCUMENTS

| | | | |
|---|---|---|---|
| 4,454,546 A | 6/1984 | Mori | |
| 4,691,329 A | 9/1987 | Juri et al. | |
| 4,796,087 A | 1/1989 | Guichard et al. | |
| 4,800,432 A | 1/1989 | Barnett et al. | |
| 4,849,812 A | 7/1989 | Borgers et al. | |
| 4,999,705 A | 3/1991 | Puri | |
| 5,021,879 A | 6/1991 | Vogel | |
| 5,068,724 A | 11/1991 | Krause et al. | |
| 5,089,887 A | 2/1992 | Robert et al. | |
| 5,091,782 A | 2/1992 | Krause et al. | |
| 5,117,287 A | 5/1992 | Koike et al. | |
| 5,155,594 A | 10/1992 | Bernstein et al. | |

(Continued)

FOREIGN PATENT DOCUMENTS

EP 0 279 053 8/1988

(Continued)

OTHER PUBLICATIONS

"ITU-T Recommendation H.261: Video Codec for Audiovisual Services at px64 kbits," *Telecomm. Standardization Sector of Int'l Telecomm. Union*, 28 pp. (Mar. 1993).

(Continued)

*Primary Examiner*—Wenpeng Chen
*Assistant Examiner*—Yuzhen Ge
(74) *Attorney, Agent, or Firm*—Klarquist Sparkman, LLP

(57) ABSTRACT

Various techniques and tools for encoding and decoding (e.g., in a video encoder/decoder) binary information (e.g., skipped macroblock information) are described. In some embodiments, the binary information is arranged in a bit plane, and the bit plane is coded at the picture/frame layer. The encoder and decoder process the binary information and, in some embodiments, switch coding modes. For example, the encoder and decoder use normal, row-skip, column-skip, or differential modes, or other and/or additional modes. In some embodiments, the encoder and decoder define a skipped macroblock as a predicted macroblock whose motion is equal to its causally predicted motion and which has zero residual error. In some embodiments, the encoder and decoder use a raw coding mode to allow for low-latency applications.

4 Claims, 18 Drawing Sheets

U.S. PATENT DOCUMENTS

| | | | |
|---|---|---|---|
| 5,157,490 A | | 10/1992 | Kawai et al. |
| 5,258,836 A | | 11/1993 | Murata |
| 5,274,453 A | | 12/1993 | Maeda |
| 5,319,463 A | | 6/1994 | Hongu et al. |
| 5,335,299 A | * | 8/1994 | Atkinson .................... 382/244 |
| 5,376,971 A | | 12/1994 | Kadono et al. |
| 5,379,351 A | | 1/1995 | Fandrianto et al. |
| 5,400,075 A | | 3/1995 | Savatier |
| 5,422,676 A | | 6/1995 | Herpel et al. |
| 5,448,297 A | | 9/1995 | Alattar et al. |
| 5,461,421 A | | 10/1995 | Moon |
| 5,465,118 A | | 11/1995 | Hancock et al. |
| 5,467,086 A | | 11/1995 | Jeong |
| 5,477,272 A | | 12/1995 | Zhang et al. |
| RE35,158 E | | 2/1996 | Sugiyama |
| 5,510,840 A | | 4/1996 | Yonemitsu et al. |
| 5,517,327 A | | 5/1996 | Nakatani et al. |
| 5,539,466 A | | 7/1996 | Igarashi et al. |
| 5,544,286 A | | 8/1996 | Laney |
| 5,546,129 A | | 8/1996 | Lee |
| 5,550,541 A | | 8/1996 | Todd |
| 5,552,832 A | | 9/1996 | Astle |
| 5,594,504 A | | 1/1997 | Ebrahimi |
| 5,598,215 A | | 1/1997 | Watanabe |
| 5,598,216 A | | 1/1997 | Lee |
| 5,617,144 A | | 4/1997 | Lee |
| 5,619,281 A | | 4/1997 | Jung |
| 5,666,461 A | | 9/1997 | Igarashi et al. |
| 5,668,608 A | | 9/1997 | Lee |
| 5,668,932 A | | 9/1997 | Laney |
| 5,673,370 A | | 9/1997 | Laney |
| 5,689,306 A | | 11/1997 | Jung |
| 5,692,063 A | | 11/1997 | Lee et al. |
| 5,701,164 A | * | 12/1997 | Kato .......................... 348/699 |
| 5,748,789 A | | 5/1998 | Lee et al. |
| 5,764,807 A | * | 6/1998 | Pearlman et al. ........... 382/240 |
| 5,764,814 A | | 6/1998 | Chen et al. |
| 5,784,175 A | | 7/1998 | Lee |
| 5,796,438 A | * | 8/1998 | Hosono ...................... 348/458 |
| 5,835,144 A | | 11/1998 | Matsumura et al. |
| 5,835,149 A | | 11/1998 | Astle |
| 5,874,995 A | | 2/1999 | Naimpally et al. |
| 5,946,042 A | | 8/1999 | Kato |
| 5,946,043 A | | 8/1999 | Lee et al. |
| 5,946,419 A | | 8/1999 | Chen et al. |
| 5,959,673 A | | 9/1999 | Lee et al. |
| 5,970,173 A | | 10/1999 | Lee et al. |
| 5,973,743 A | | 10/1999 | Han |
| 5,974,184 A | | 10/1999 | Eifrig |
| 5,982,437 A | | 11/1999 | Okazaki et al. |
| 5,982,438 A | | 11/1999 | Lin et al. |
| 6,026,195 A | | 2/2000 | Eifrig et al. |
| 6,035,070 A | | 3/2000 | Moon et al. |
| 6,040,863 A | * | 3/2000 | Kato ...................... 375/240.16 |
| 6,052,150 A | | 4/2000 | Kikuchi |
| 6,094,225 A | | 7/2000 | Han |
| RE36,822 E | | 8/2000 | Sugiyama |
| 6,148,033 A | | 11/2000 | Pearlstein et al. |
| 6,154,495 A | | 11/2000 | Yamaguchi et al. |
| 6,192,081 B1 | | 2/2001 | Chiang et al. |
| 6,208,761 B1 | | 3/2001 | Passaggio et al. |
| 6,215,905 B1 | | 4/2001 | Lee et al. |
| RE37,222 E | | 6/2001 | Yonemitsu et al. |
| 6,243,418 B1 | | 6/2001 | Kim |
| 6,259,810 B1 | | 7/2001 | Gill et al. |
| 6,271,885 B2 | | 8/2001 | Sugiyama |
| 6,275,531 B1 | | 8/2001 | Li |
| 6,292,585 B1 | | 9/2001 | Yamaguchi et al. |
| 6,304,928 B1 | | 10/2001 | Mairs et al. |
| 6,324,216 B1 | | 11/2001 | Igarashi et al. |
| 6,332,003 B1 | * | 12/2001 | Matsuura et al. ...... 375/240.23 |
| 6,496,601 B1 | | 12/2002 | Migdal et al. |
| 6,563,953 B2 | | 5/2003 | Lin et al. |
| 6,573,905 B1 | | 6/2003 | MacInnis et al. |
| 6,614,442 B1 | * | 9/2003 | Ouyang et al. ............. 345/545 |
| 6,683,987 B1 | * | 1/2004 | Sugahara .................... 382/235 |
| 6,785,331 B1 | * | 8/2004 | Jozawa et al. .......... 375/240.12 |
| 6,795,584 B2 | | 9/2004 | Karczewicz et al. |
| 6,798,364 B2 | * | 9/2004 | Chen et al. .................. 341/67 |
| 6,819,714 B2 | * | 11/2004 | Yamada et al. ........ 375/240.12 |
| 6,862,402 B2 | * | 3/2005 | Kim .......................... 386/111 |
| 6,975,680 B2 | | 12/2005 | Demos |
| 2002/0012394 A1 | | 1/2002 | Hatano et al. |
| 2002/0114388 A1 | * | 8/2002 | Ueda et al. ............ 375/240.01 |
| 2002/0168066 A1 | | 11/2002 | Li |
| 2003/0099292 A1 | | 5/2003 | Wang et al. |
| 2003/0142748 A1 | | 7/2003 | Tourapis |
| 2003/0156643 A1 | | 8/2003 | Song |
| 2004/0042549 A1 | | 3/2004 | Huang et al. |
| 2004/0136457 A1 | | 7/2004 | Funnell et al. |
| 2004/0141651 A1 | | 7/2004 | Hara et al. |
| 2005/0053156 A1 | | 3/2005 | Lin et al. |
| 2005/0135484 A1 | | 6/2005 | Lee et al. |
| 2005/0254584 A1 | | 11/2005 | Kim et al. |

FOREIGN PATENT DOCUMENTS

| | | |
|---|---|---|
| EP | 0 588 653 | 3/1994 |
| EP | 0 614 318 | 9/1994 |
| EP | 0 625 853 | 11/1994 |
| EP | 0 651 574 | 5/1995 |
| EP | 0 771 114 | 5/1997 |
| EP | 0 786 907 | 7/1997 |
| EP | 0 830 029 | 3/1998 |
| JP | 1869940 | 9/1986 |
| JP | 2562499 | 1/1991 |
| JP | 2510456 | 3/1994 |
| JP | 06-276481 | 9/1994 |
| JP | 06-276511 | 9/1994 |
| JP | 2951861 | 10/1995 |
| JP | 08-140099 | 5/1996 |
| JP | 09-322163 | 12/1997 |
| JP | 2524044 | 10/2004 |
| KR | 1003538510000 | 1/2002 |
| WO | WO2005004491 | 1/2005 |

OTHER PUBLICATIONS

"International Standard ISO-IEC 11172-2: Information Technology—Coding of Moving Pictures and Associated Audio for Digital Storage Media at up to About 1,5 Mbit/s," *ISO/IEC*, pp. ii, 3-10, 17, 28-38, 54-57, 93-95, 99-101 (Aug. 1993).

"ITU-T Recommendation H.262: Information Technology—Generic Coding of Moving Pictures and Associated Audio Information: Video," *Telecomm. Standardization Sector of Int'l Telecomm. Union*, pp. i-iii, 2-8, 20-23, 59-61, 64, 65, 72, 73, 78-80, 82, 85, 86, 88, 100, 104, 151 (Jul. 1995).

"ISO/IEC JTC1/SC29/WG11 N2202: Information Technology—Coding of Audio-Visual Objects: Visual," *ISO/IEC 14496-2 Committee Draft*, pp. i-xii, 13, 35, 36, 158, 159, 163, 174, 175, 179-181, 194-197 (Mar. 1998).

"ITU-T Recommendation H.263: Video Coding for Low Bit Rate Communication," *Telecomm. Standardization Sector of Int'l Telecomm. Union*, pp. i-x, 33-40, 44, 45, 60, 61, 102-116 (Feb. 1998).

Hsu et al., "A Low Bit-Rate Video Codec Based on Two-Dimensional Mesh Motion Compensation with Adaptive Interpolation," *IEEE, Transactions on Circuits and Systems for Video Technology*, vol. II, No. 1, pp. 111-117 (Jan. 2001).

"Coding of Moving Pictures and Associated Audio Information," *ISO/IEC JTC1/SC29/WG11, MPEG-4 Video Verification Model* (Feb. 1998).

"ITU-T Recommendation T.6: Facsimile Coding Schemes and Coding Control Functions for Group 4 Facsimile Apparatus,"*Facicle VII.3 of the Blue Book*, (1988).

"Run-Length Coding of Skipped Macroblocks," *Thirteenth Meeting of ITU Telecommunications Standardization Sector, Study Group 16, VCEG*, Austin, Texas (Apr. 2001).

"Interlace Coding Tools for H.26L Video Coding," *Fifteenth Meeting of ITU Telecommunications Standardization Sector, Study Group 16, VCEG*, Thailand (Dec. 2001).

Cliff Reader, "History of MPEG Video Compression—Ver. 4.0," document marked Dec. 16, 2003.

U.S. Appl. No. 60/341,674, filed Dec. 17, 2001, Lee et al.

Joint Video Team (JVT) of ISO/IEC MPEG and ITU-T VCEG, "Joint Model No. 1, Revision 1 (JM-1r1)," JVT-A003r1, Pattaya, Thailand, 80 pp. (Dec. 2001).

Printouts of FTP directories from http://ftp3.itu.ch , 8 pp. (downloaded from the World Wide Web on Sep. 20, 2005.).

Anonymous, "DivX Multi Standard Video Encoder," 2 pp. [Downloaded from the World Wide Web on Jan. 24, 2006].

U.S. Appl. No. 60/488,710, filed Jul. 18, 2003, Srinivasan et al.

Joint Video Team of ISO/IEC MPEG and ITU-T VCEG, "Committee Draft of Joint Video Specification (ITU-T Recommendation H.264, ISO/IEC 14496-10 AVC," 206 pp. (Aug. 2002).

Kim et al., "Low-Complexity Macroblock Mode Selection for H.264/Avc Encoders," 4 pp. (no date).

Microsoft Corporation, "Microsoft Debuts New Windows Media Players 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 19, 2002) [Downloaded from the World Wide Web on Aug. 8, 2003].

Sullivan et al., "The H.264/AVC Advanced Video Coding Standard: Overview and Introduction to the Fidelity Range Extensions," 21 pp. (Aug. 2004).

\* cited by examiner

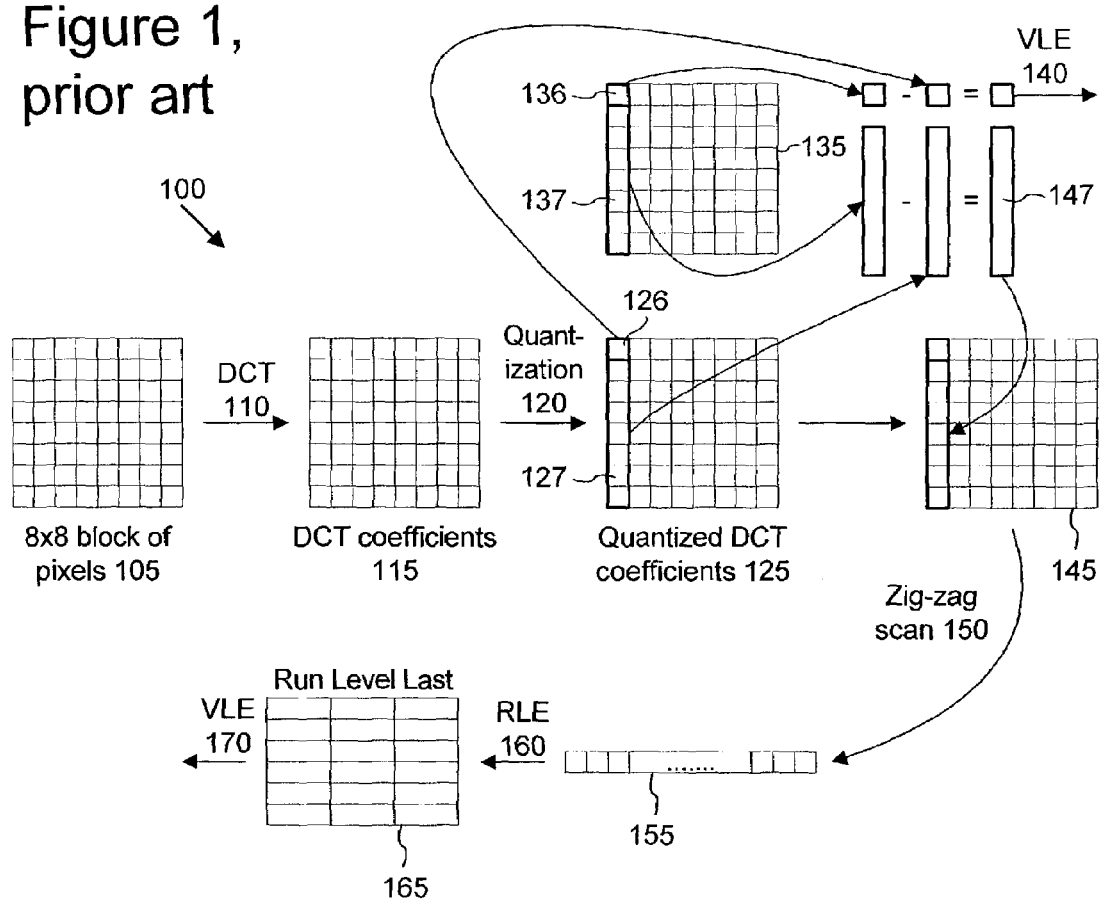
Figure 1, prior art
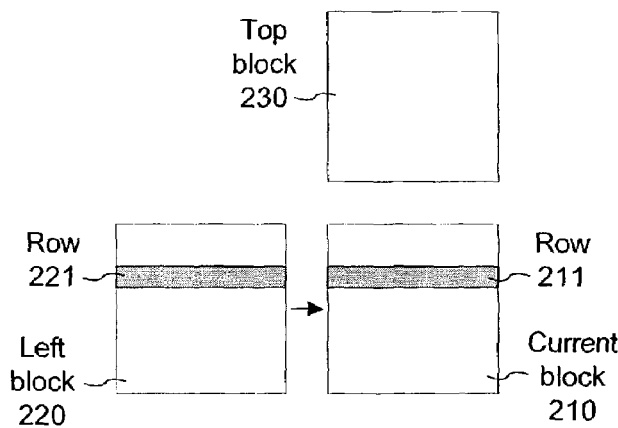
Figure 2, prior art

Figure 3, prior art
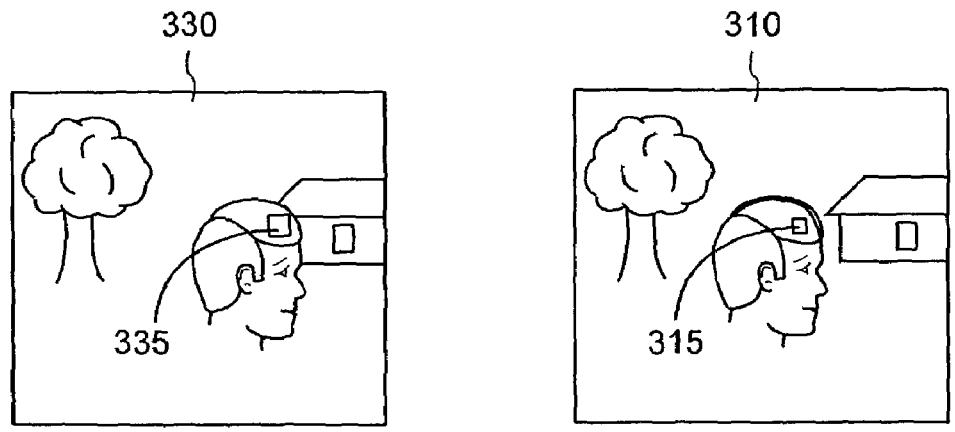
Figure 6
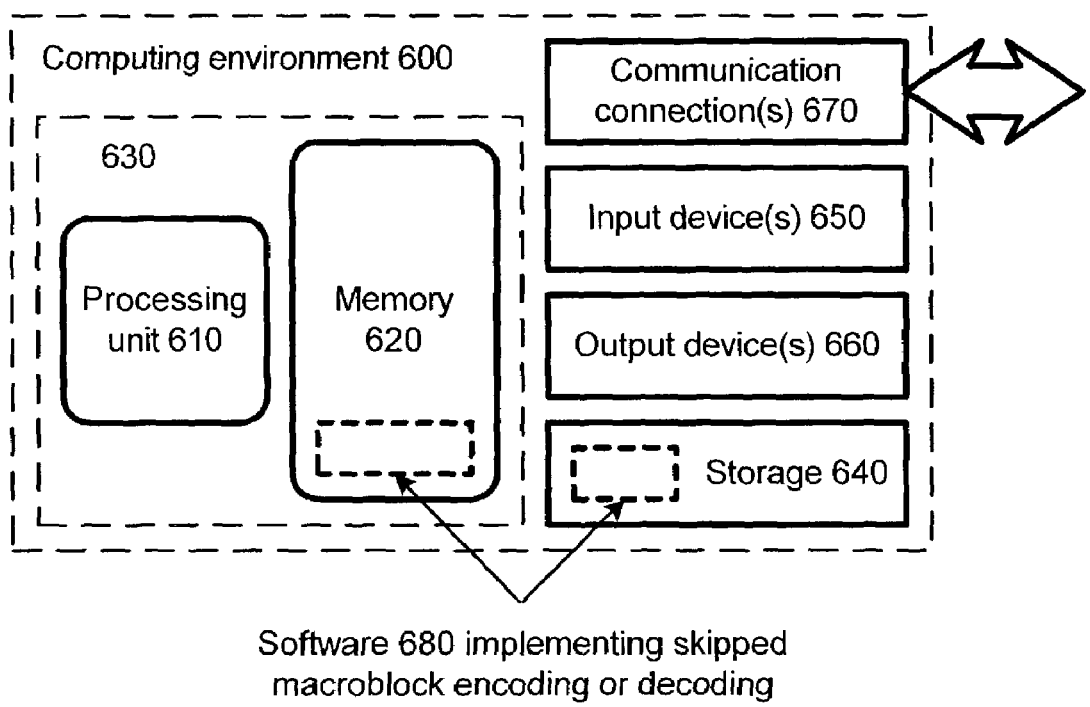
Software 680 implementing skipped macroblock encoding or decoding

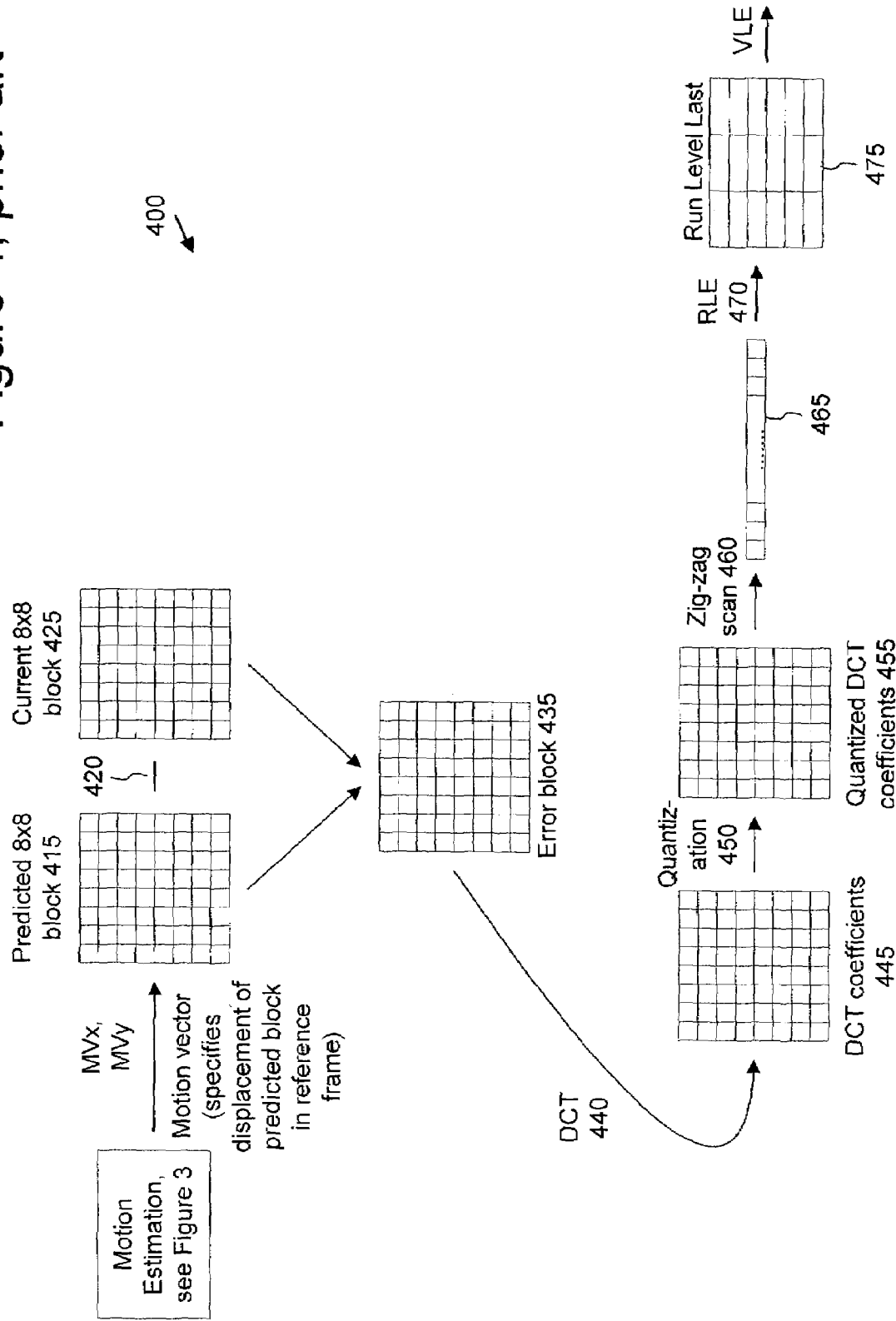

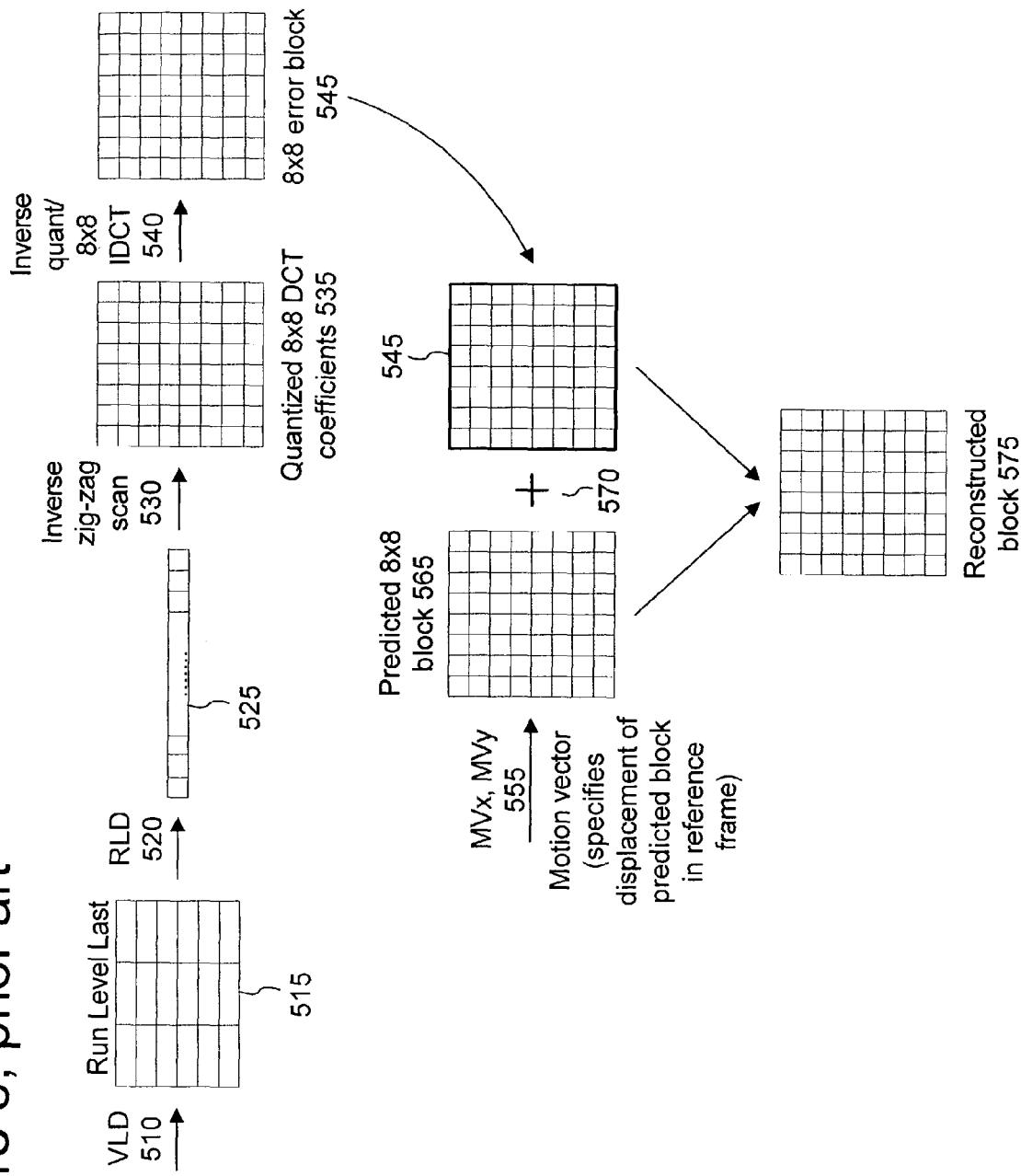
Figure 5, prior art

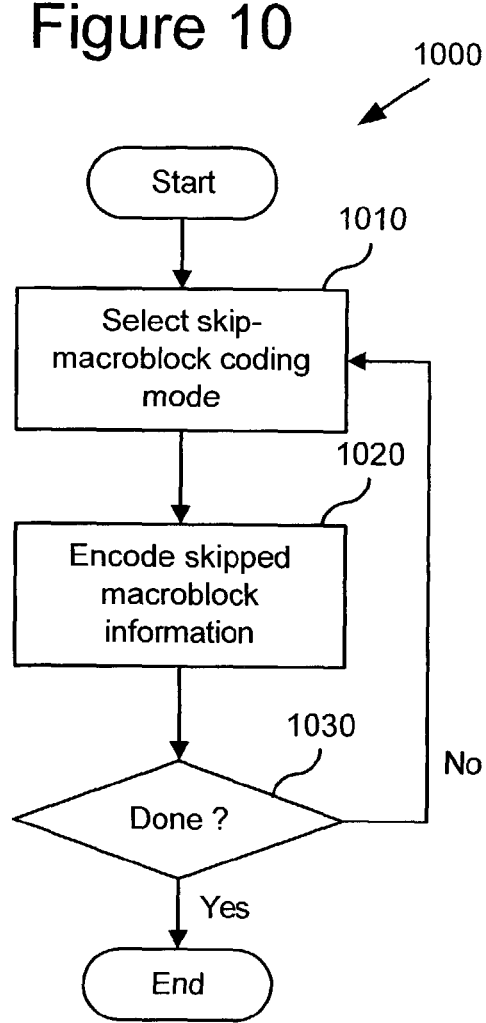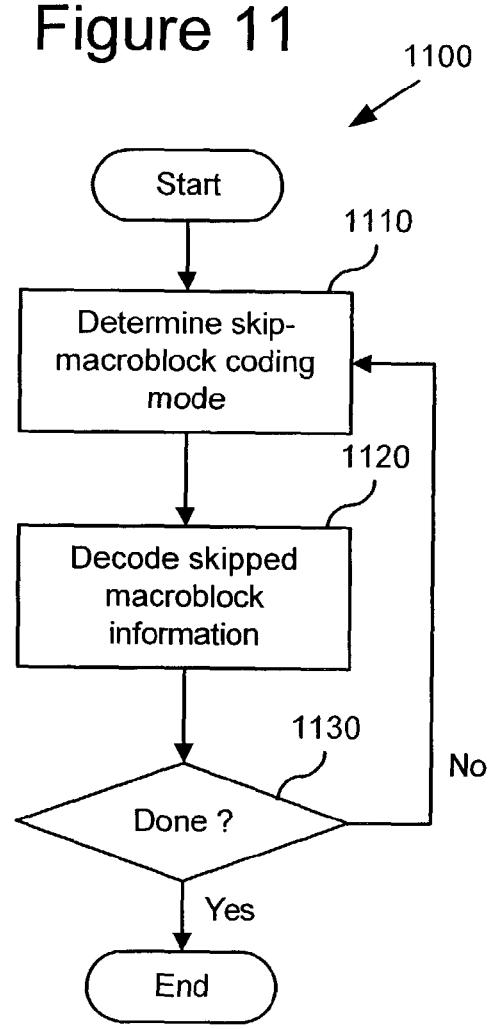

```
for (mbrow = 0; mbrow < NumMBRows; mbrow++)
{
        if (get_bits(1) == 1)
                ## All the macroblocks in this macroblock row are skipped
        else
        {
                ## At least one macroblock in this row is not skipped
                ## Get coded status of each macroblock in the row starting from left-to-right
                for (mb = 0; mb < NumMBsPerRow; mb++)
                        k = get_bits(1); ## k equals status of macroblock
                                ## k ==0 if not skipped, k == 1 if skipped
        }
}
```

1700

```
for (mbcol = 0; mbcol < NumMBColumns; mbcol++)
{
        if (get_bits(1) == 1)
                ## All the macroblocks in this macroblock column are skipped
        else
        {
                ## At least one macroblock in this column is not skipped.
                ## Get coded status of each macroblock in column starting from top-to-bottom
                for (mb = 0; mb < NumMBsPerColumn; mb++)
                        k = get_bits(1); ## k equals status of macroblock
                                ## k ==0 if not skipped, k == 1 if skipped
        }
}
```

SKIP MACROBLOCK CODING

RELATED APPLICATION INFORMATION

The present application claims the benefit of U.S. Provisional Patent Application Ser. No. 60/341,674, entitled "Techniques and Tools for Video Encoding and Decoding," filed Dec. 17, 2001, the disclosure of which is incorporated by reference. The present application also claims the benefit of U.S. Provisional Patent Application Ser. No. 60/377,712, entitled "Skip Macroblock Coding," filed May 3, 2002, the disclosure of which is incorporated by reference.

TECHNICAL FIELD

Techniques and tools for encoding/decoding binary information in video coding/decoding applications are described. For example, a video encoder encodes skipped macroblock information.

BACKGROUND

Digital video consumes large amounts of storage and transmission capacity. A typical raw digital video sequence includes 15 or 30 frames per second. Each frame can include tens or hundreds of thousands of pixels (also called pels). Each pixel represents a tiny element of the picture. In raw form, a computer commonly represents a pixel with 24 bits. Thus, the number of bits per second, or bit rate, of a typical raw digital video sequence can be 5 million bits/second or more.

Most computers and computer networks lack the resources to process raw digital video. For this reason, engineers use compression (also called coding or encoding) to reduce the bit rate of digital video. Compression can be lossless, in which quality of the video does not suffer but decreases in bit rate are limited by the complexity of the video. Or, compression can be lossy, in which quality of the video suffers but decreases in bit rate are more dramatic. Decompression reverses compression.

In general, video compression techniques include intraframe compression and interframe compression. Intraframe compression techniques compress individual frames, typically called I-frames, or key frames. Interframe compression techniques compress frames with reference to preceding and/or following frames, and are called typically called predicted frames, P-frames, or B-frames.

Microsoft Corporation's Windows Media Video, Version 7 ["WMV7"] includes a video encoder and a video decoder. The WMV7 encoder uses intraframe and interframe compression, and the WMV7 decoder uses intraframe and interframe decompression.

A. Intraframe Compression in WMV7

FIG. 1 illustrates block-based intraframe compression (100) of a block (105) of pixels in a key frame in the WMV7 encoder. A block is a set of pixels, for example, an 8×8 arrangement of pixels. The WMV7 encoder splits a key video frame into 8×8 blocks of pixels and applies an 8×8 Discrete Cosine Transform ["DCT"] (110) to individual blocks such as the block (105). A DCT is a type of frequency transform that converts the 8×8 block of pixels (spatial information) into an 8×8 block of DCT coefficients (115), which are frequency information. The DCT operation itself is lossless or nearly lossless. Compared to the original pixel values, however, the DCT coefficients are more efficient for the encoder to compress since most of the significant information is concentrated in low frequency coefficients (conventionally, the upper left of the block (115)) and many of the high frequency coefficients (conventionally, the lower right of the block (115)) have values of zero or close to zero.

The encoder then quantizes (120) the DCT coefficients, resulting in an 8×8 block of quantized DCT coefficients (125). For example, the encoder applies a uniform, scalar quantization step size to each coefficient, which is analogous to dividing each coefficient by the same value and rounding. For example, if a DCT coefficient value is 163 and the step size is 10, the quantized DCT coefficient value is 16. Quantization is lossy. The reconstructed DCT coefficient value will be 160, not 163. Since low frequency DCT coefficients tend to have higher values, quantization results in loss of precision but not complete loss of the information for the coefficients. On the other hand, since high frequency DCT coefficients tend to have values of zero or close to zero, quantization of the high frequency coefficients typically results in contiguous regions of zero values. In addition, in some cases high frequency DCT coefficients are quantized more coarsely than low frequency DCT coefficients, resulting in greater loss of precision/information for the high frequency DCT coefficients.

The encoder then prepares the 8×8 block of quantized DCT coefficients (125) for entropy encoding, which is a form of lossless compression. The exact type of entropy encoding can vary depending on whether a coefficient is a DC coefficient (lowest frequency), an AC coefficient (other frequencies) in the top row or left column, or another AC coefficient.

The encoder encodes the DC coefficient (126) as a differential from the DC coefficient (136) of a neighboring 8×8 block, which is a previously encoded neighbor (e.g., top or left) of the block being encoded. (FIG. 1 shows a neighbor block (135) that is situated to the left of the block being encoded in the frame.) The encoder entropy encodes (140) the differential.

The entropy encoder can encode the left column or top row of AC coefficients as a differential from a corresponding column or row of the neighboring 8×8 block. FIG. 1 shows the left column (127) of AC coefficients encoded as a differential (147) from the left column (137) of the neighboring (to the left) block (135). The differential coding increases the chance that the differential coefficients have zero values. The remaining AC coefficients are from the block (125) of quantized DCT coefficients.

The encoder scans (150) the 8×8 block (145) of predicted, quantized AC DCT coefficients into a one-dimensional array (155) and then entropy encodes the scanned AC coefficients using a variation of run length coding (160). The encoder selects an entropy code from one or more run/level/last tables (165) and outputs the entropy code.

A key frame contributes much more to bit rate than a predicted frame. In low or mid-bit rate applications, key frames are often critical bottlenecks for performance, so efficient compression of key frames is critical.

FIG. 2 illustrates a disadvantage of intraframe compression such as shown in FIG. 1. In particular, exploitation of redundancy between blocks of the key frame is limited to prediction of a subset of frequency coefficients (e.g., the DC coefficient and the left column (or top row) of AC coefficients) from the left (220) or top (230) neighboring block of a block (210). The DC coefficient represents the average of the block, the left column of AC coefficients represents the averages of the rows of a block, and the top row represents the averages of the columns. In effect, prediction of DC and AC coefficients as in WMV7 limits extrapolation to the row-wise (or column-wise) average signals of the left (or top) neighboring block. For a particular row (221) in the left block (220), the AC coefficients in the left DCT coefficient column for the left block (220) are used to predict the entire corresponding row (211) of the block (210).

B. Interframe Compression in WMV7

Interframe compression in the WMV7 encoder uses block-based motion compensated prediction coding followed by transform coding of the residual error. FIGS. 3 and 4 illustrate the block-based interframe compression for a predicted frame in the WMV7 encoder. In particular, FIG. 3 illustrates motion estimation for a predicted frame (310) and FIG. 4 illustrates compression of a prediction residual for a motion-estimated block of a predicted frame.

The WMV7 encoder splits a predicted frame into 8×8 blocks of pixels. Groups of 4 8×8 blocks form macroblocks. For each macroblock, a motion estimation process is performed. The motion estimation approximates the motion of the macroblock of pixels relative to a reference frame, for example, a previously coded, preceding frame. In FIG. 3, the WMV7 encoder computes a motion vector for a macroblock (315) in the predicted frame (310). To compute the motion vector, the encoder searches in a search area (335) of a reference frame (330). Within the search area (335), the encoder compares the macroblock (315) from the predicted frame (310) to various candidate macroblocks in order to find a candidate macroblock that is a good match. The encoder can check candidate macroblocks every pixel or every ½ pixel in the search area (335), depending on the desired motion estimation resolution for the encoder. Other video encoders check at other increments, for example, every ¼ pixel. For a candidate macroblock, the encoder checks the difference between the macroblock (315) of the predicted frame (310) and the candidate macroblock and the cost of encoding the motion vector for that macroblock. After the encoder finds a good matching macroblock, the block matching process ends. The encoder outputs the motion vector (entropy coded) for the matching macroblock so the decoder can find the matching macroblock during decoding. When decoding the predicted frame (310), a decoder uses the motion vector to compute a prediction macroblock for the macroblock (315) using information from the reference frame (330). The prediction for the macroblock (315) is rarely perfect, so the encoder usually encodes 8×8 blocks of pixel differences (also called the error or residual blocks) between the prediction macroblock and the macroblock (315) itself.

FIG. 4 illustrates the computation and encoding of an error block (435) for a motion-estimated block in the WMV7 encoder. The error block (435) is the difference between the predicted block (415) and the original current block (425). The encoder applies a DCT (440) to error block (435), resulting in 8×8 block (445) of coefficients. Even more than was the case with DCT coefficients for pixel values, the significant information for the error block (435) is concentrated in low frequency coefficients (conventionally, the upper left of the block (445)) and many of the high frequency coefficients have values of zero or close to zero (conventionally, the lower right of the block (445)).

The encoder then quantizes (450) the DCT coefficients, resulting in an 8×8 block of quantized DCT coefficients (455). The quantization step size is adjustable. Again, since low frequency DCT coefficients tend to have higher values, quantization results in loss of precision, but not complete loss of the information for the coefficients. On the other hand, since high frequency DCT coefficients tend to have values of zero or close to zero, quantization of the high frequency coefficients results in contiguous regions of zero values. In addition, in some cases high frequency DCT coefficients are quantized more coarsely than low frequency DCT coefficients, resulting in greater loss of precision/information for the high frequency DCT coefficients.

The encoder then prepares the 8×8 block (455) of quantized DCT coefficients for entropy encoding. The encoder scans (460) the 8×8 block (455) into a one dimensional array (465) with 64 elements, such that coefficients are generally ordered from lowest frequency to highest frequency, which typical creates long runs of zero values.

The encoder entropy encodes the scanned coefficients using a variation of run length coding (470). The encoder selects an entropy code from one or more run/level/last tables (475) and outputs the entropy code.

When the motion vector for a macroblock is zero (i.e., no motion) and no residual block information is transmitted for the macroblock, the encoder uses a 1-bit skip macroblock flag for the macroblock. For many kinds of video content (e.g., low motion and/or low bitrate video), this reduces bitrate by avoiding the transmission of motion vector and residual block information. The encoder puts the skip macroblock flag for a macroblock at the macroblock layer in the output bitstream, along with other information for the macroblock.

FIG. 5 shows the decoding process (500) for an inter-coded block. Due to the quantization of the DCT coefficients, the reconstructed block (575) is not identical to the corresponding original block. The compression is lossy.

In summary of FIG. 5, a decoder decodes (510, 520) entropy-coded information representing a prediction residual using variable length decoding and one or more run/level/last tables (515). The decoder inverse scans (530) a one-dimensional array (525) storing the entropy-decoded information into a two-dimensional block (535). The decoder inverse quantizes and inverse discrete cosine transforms (together, 540) the data, resulting in a reconstructed error block (545). In a separate path, the decoder computes a predicted block (565) using motion vector information (555) for displacement from a reference frame. The decoder combines (570) the predicted block (555) with the reconstructed error block (545) to form the reconstructed block (575).

When the decoder receives a skip macroblock flag for a macroblock, the decoder skips computing a prediction and decoding residual block information for the macroblock. Instead, the decoder uses corresponding pixel data from the location of the macroblock in the reference frame.

The amount of change between the original and reconstructed frame is termed the distortion and the number of bits required to code the frame is termed the rate. The amount of distortion is roughly inversely proportional to the rate. In other words, coding a frame with fewer bits (greater compression) will result in greater distortion and vice versa. One of the goals of a video compression scheme is to try to improve the rate-distortion—in other words to try to achieve the same distortion using fewer bits (or the same bits and lower distortion).

Although the use of skip macroblock flags in WMV7 typically reduces bitrate for many kinds of video content, it is less than optimal in some circumstances. In many cases, it fails to exploit redundancy in skip macroblock flags from macroblock to macroblock, for example, when skipped macroblocks occur in bunches in a picture. Also, WMV7 ignores motion prediction for macroblocks in predicted frames when the macroblocks are skipped, which hurts the efficiency of compression of predicted frames in some cases.

C. Standards for Video Compression and Decompression

Aside from WMV7, several international standards relate to video compression and decompression. These standards include the Motion Picture Experts Group ["MPEG"] 1, 2, and 4 standards and the H.261, H.262, and H.263 standards from the International Telecommunication Union ["ITU"]. Like WMV7, these standards use a combination of intraframe and interframe compression, although the standards typically differ from WMV7 in the details of the compression techniques used.

Some international standards recognize skipping coding of macroblocks as a tool to be used in video compression and decompression. For additional detail about skip macroblock coding in the standards, see the standards' specifications themselves.

The skipped macroblock coding in the above standards typically reduces bitrate for many kinds of video content, but is less than optimal in some circumstances. In many cases, it fails to exploit redundancy in skip macroblock flags from macroblock to macroblock, for example, when skipped macroblocks occur in bunches in a picture. Also, it ignores motion prediction for macroblocks in predicted macroblocks/pictures when the macroblocks are skipped, which hurts the efficiency of compression of predicted macroblocks/pictures in some cases.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for encoding and decoding (e.g., in a video encoder/decoder) binary information. The binary information may comprise bits indicating whether a video encoder or decoder skips certain macroblocks in a video frame. Or, the binary information may comprise bits indicating motion vector resolution for macroblocks (e.g. 1-MV or 4-MV), interlace mode (e.g., field or frame), or some other information. Binary information may be encoded on a frame-by-frame basis or on some other basis.

In some embodiments, the binary information is arranged in a bit plane. For example, the bit plane is coded at the picture/frame layer. Alternatively, the binary information is arranged in some other way and/or coded at a different layer. The encoder and decoder process the binary information. The binary information may comprise macroblock-level information. Alternatively, the encoder and decoder process bit planes of block-level, sub-block-level, or pixel-level information.

In some embodiments, the encoder and decoder switch coding modes. For example, the encoder and decoder use normal, row-skip, or column-skip mode. The different modes allow the encoder and decoder to exploit redundancy in the binary information. Alternatively, the encoder and decoder use other and/or additional modes such as differential modes. To increase efficiency, the encoder and decoder may use a bit plane inversion technique in some modes.

In some embodiments, the encoder and decoder define a skipped macroblock as a predicted macroblock whose motion is equal to its causally predicted motion and which has zero residual error. Alternatively, the encoder and decoder define a skipped macroblock as a predicted macroblock with zero motion and zero residual error.

In some embodiments, the encoder and decoder use a raw coding mode to allow for low-latency applications. For example, in the raw coding mode, encoded macroblocks can be transmitted to the decoder right away, without having to wait until all macroblocks in the frame/picture are encoded. The encoder and decoder can switch between the raw coding mode and other modes.

The various techniques and tools can be used in combination or independently. In particular, the application describes two implementations of skipped macroblock encoding and decoding, along with corresponding bitstream syntaxes. Different embodiments implement one or more of the described techniques and tools.

Additional features and advantages will be made apparent from the following detailed description of different embodiments that proceeds with reference to the accompanying drawings.

BRIEF DESCRIPTION OF THE DRAWINGS

FIG. 1 is a diagram showing block-based intraframe compression of an 8×8 block of pixels according to prior art.

FIG. 2 is a diagram showing prediction of frequency coefficients according to the prior art.

FIG. 3 is a diagram showing motion estimation in a video encoder according to the prior art.

FIG. 4 is a diagram showing block-based interframe compression for an 8×8 block of prediction residuals in a video encoder according to the prior art.

FIG. 5 is a diagram showing block-based intraframe decompression for an 8×8 block of prediction residuals according to the prior art.

FIG. 6 is a block diagram of a suitable computing environment in which several described embodiments may be implemented.

FIG. 10 is a flowchart showing a technique for encoding skipped macroblock information in a video encoder having plural skip-macroblock coding modes.

FIG. 11 is a flowchart showing a technique for decoding skipped macroblock information encoded by a video encoder having plural skip-macroblock coding modes.

DETAILED DESCRIPTION

Figure 7:
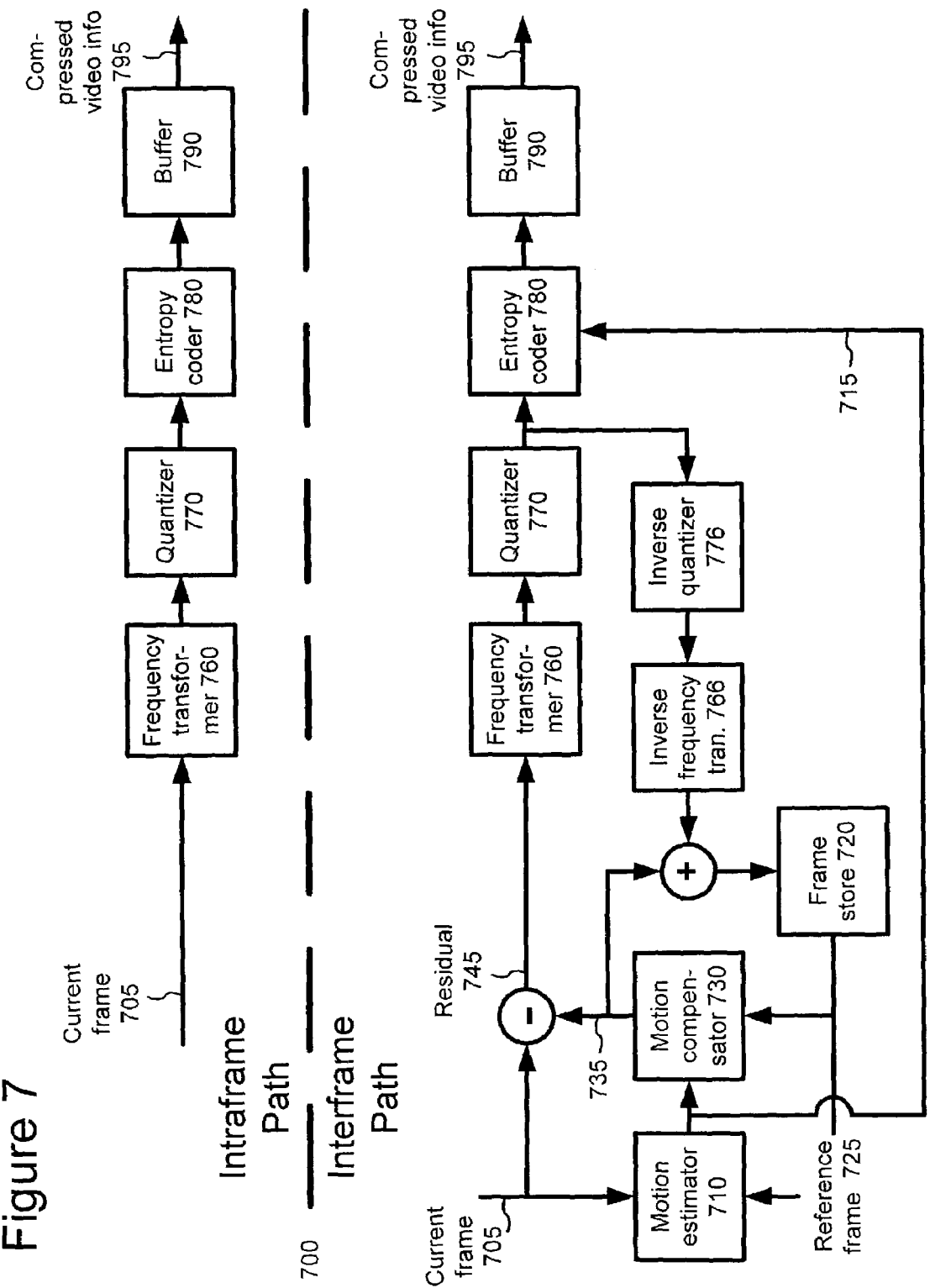
FIG. 7 is a block diagram of a generalized video encoder system used in several described embodiments.

Described embodiments relate to techniques and tools for encoding and decoding (e.g., in a video encoder/decoder) binary information. The binary information may comprise bits indicating whether a video encoder or decoder skips certain macroblocks in a video frame. Or, the binary information may comprise bits indicating motion vector resolution for macroblocks (e.g. 1-MV or 4-MV), interlace mode (e.g., field or frame), or some other information. Binary information may be encoded on a frame-by-frame basis or on some other basis.

In some embodiments, the binary information is arranged in a bit plane. The bit plane is coded at the picture/frame layer. Alternatively, the binary information is arranged in some other way and/or coded at a different layer.

In some embodiments, the encoder and decoder switch coding modes. For example, the encoder and decoder use normal, row-skip, or column-skip modes. The different modes allow the encoder and decoder to exploit redundancy in the binary information. Alternatively, the encoder and decoder use other and/or additional modes.

In some embodiments, the encoder and decoder define a skipped macroblock as a predicted macroblock whose motion is equal to its causally predicted motion and which has zero residual error. Alternatively, the encoder and decoder define a skipped macroblock as a predicted macroblock with zero motion and zero residual error.

In some embodiments, instead of efficient frame/picture-level coding, a raw coding mode is permitted to allow for low-latency applications. In the raw coding mode, encoded macroblocks can be transmitted to the decoder right away, without having to wait until all macroblocks in the frame/picture are encoded.

In some embodiments, the encoder and decoder process bit planes of macroblock level information. Alternatively, the encoder and decoder process bit planes of block, sub-block, or pixel-level information.

The various techniques and tools can be used in combination or independently. In particular, the application describes two implementations of skipped macroblock encoding and decoding, along with corresponding bitstream syntaxes. Different embodiments implement one or more of the described techniques and tools.

In described embodiments, the video encoder and decoder perform various techniques. Although the operations for these techniques are typically described in a particular, sequential order for the sake of presentation, it should be understood that this manner of description encompasses minor rearrangements in the order of operations, unless a particular ordering is required. For example, operations described sequentially may in some cases be rearranged or performed concurrently. Moreover, for the sake of simplicity, flowcharts typically do not show the various ways in which particular techniques can be used in conjunction with other techniques.

In described embodiments, the video encoder and decoder use various flags and signals in a bitstream. While specific flags and signals are described, it should be understood that this manner of description encompasses different conventions (e.g., 0's rather than 1's) for the flags and signals.

I. Computing Environment

FIG. 6 illustrates a generalized example of a suitable computing environment (600) in which several of the described embodiments may be implemented. The computing environment (600) is not intended to suggest any limitation as to scope of use or functionality, as the techniques and tools may be implemented in diverse general-purpose or special-purpose computing environments.

With reference to FIG. 6, the computing environment (600) includes at least one processing unit (610) and memory (620). In FIG. 6, this most basic configuration (630) is included within a dashed line. The processing unit (610) executes computer-executable instructions and may be a real or a virtual processor. In a multi-processing system, multiple processing units execute computer-executable instructions to increase processing power. The memory (620) may be volatile memory (e.g., registers, cache, RAM), non-volatile memory (e.g., ROM, EEPROM, flash memory, etc.), or some combination of the two. The memory (620) stores software (680) implementing an encoder or decoder, such as a video encoder or decoder.

A computing environment may have additional features. For example, the computing environment (600) includes storage (640), one or more input devices (650), one or more output devices (660), and one or more communication connections (670). An interconnection mechanism (not shown) such as a bus, controller, or network interconnects the components of the computing environment (600). Typically, operating system software (not shown) provides an operating environment for other software executing in the computing environment (600), and coordinates activities of the components of the computing environment (600).

The storage (640) may be removable or non-removable, and includes magnetic disks, magnetic tapes or cassettes, CD-ROMs, DVDs, or any other medium which can be used to store information and which can be accessed within the computing environment (600). The storage (640) stores instructions for the software (680) implementing the encoder or decoder.

The input device(s) (650) may be a touch input device such as a keyboard, mouse, pen, or trackball, a voice input device, a scanning device, or another device that provides input to the computing environment (600). For audio or video encoding, the input device(s) (650) may be a sound card, video card, TV tuner card, or similar device that accepts audio or video input in analog or digital form, or a CD-ROM or CD-RW that reads audio or video samples into the computing environment (600). The output device(s)

(660) may be a display, printer, speaker, CD-writer, or another device that provides output from the computing environment (600).

The communication connection(s) (670) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (600), computer-readable media include memory (620), storage (640), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "select," "reconstruct," and "inform" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 8:
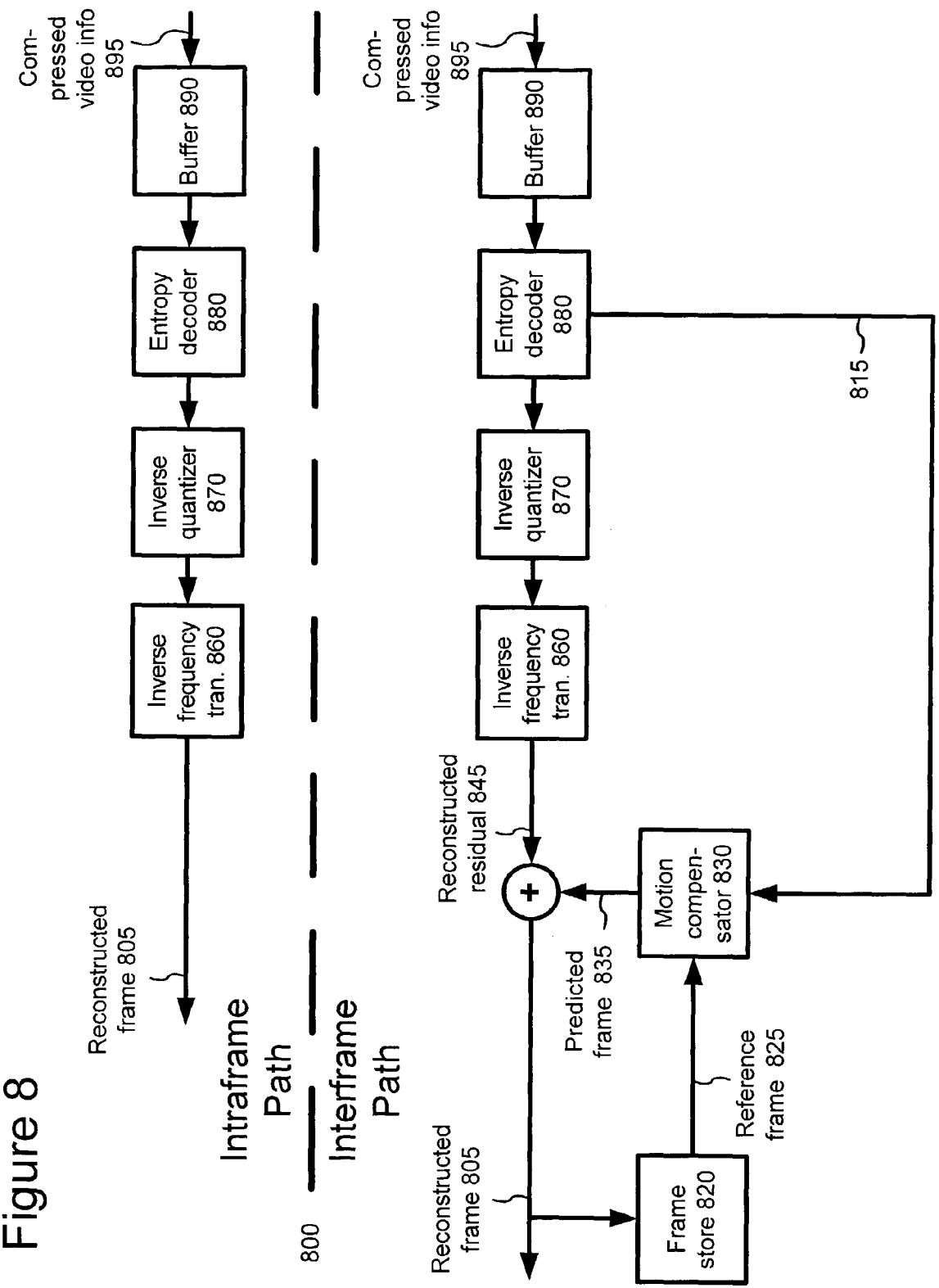
FIG. 8 is a block diagram of a generalized video decoder system used in several described embodiments.

FIG. 7 is a block diagram of a generalized video encoder (700) and FIG. 8 is a block diagram of a generalized video decoder (800).

The relationships shown between modules within the encoder and decoder indicate the main flow of information in the encoder and decoder; other relationships are not shown for the sake of simplicity. In particular, FIGS. 7 and 8 usually do not show side information indicating the encoder settings, modes, tables, etc. used for a video sequence, frame, macroblock, block, etc. Such side information is sent in the output bitstream, typically after entropy encoding of the side information. The format of the output bitstream can be Windows Media Video version 8 format or another format.

The encoder (700) and decoder (800) are block-based and use a 4:2:0 macroblock format with each macroblock including 4 luminance 8×8 luminance blocks (at times treated as one 16×16 macroblock) and two 8×8 chrominance blocks. Alternatively, the encoder (700) and decoder (800) are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 7 is a block diagram of a general video encoder system (700). The encoder system (700) receives a sequence of video frames including a current frame (705), and produces compressed video information (795) as output. Particular embodiments of video encoders typically use a variation or supplemented version of the generalized encoder (700).

The encoder system (700) compresses predicted frames and key frames. For the sake of presentation, FIG. 7 shows a path for key frames through the encoder system (700) and a path for forward-predicted frames. Many of the components of the encoder system (700) are used for compressing both key frames and predicted frames. The exact operations performed by those components can vary depending on the type of information being compressed.

A predicted frame [also called p-frame, b-frame for bi-directional prediction, or inter-coded frame] is represented in terms of prediction (or difference) from one or more other frames. A prediction residual is the difference between what was predicted and the original frame. In contrast, a key frame [also called i-frame, intra-coded frame] is compressed without reference to other frames.

If the current frame (705) is a forward-predicted frame, a motion estimator (710) estimates motion of macroblocks or other sets of pixels of the current frame (705) with respect to a reference frame, which is the reconstructed previous frame (725) buffered in the frame store (720). In alternative embodiments, the reference frame is a later frame or the current frame is bi-directionally predicted. The motion estimator (710) can estimate motion by pixel, ½ pixel, ¼ pixel, or other increments, and can switch the resolution of the motion estimation on a frame-by-frame basis or other basis. The resolution of the motion estimation can be the same or different horizontally and vertically. The motion estimator (710) outputs as side information motion information (715) such as motion vectors. A motion compensator (730) applies the motion information (715) to the reconstructed previous frame (725) to form a motion-compensated current frame (735). The prediction is rarely perfect, however, and the difference between the motion-compensated current frame (735) and the original current frame (705) is the prediction residual (745). Alternatively, a motion estimator and motion compensator apply another type of motion estimation/compensation.

A frequency transformer (760) converts the spatial domain video information into frequency domain (i.e., spectral) data. For block-based video frames, the frequency transformer (760) applies a discrete cosine transform ["DCT"] or variant of DCT to blocks of the pixel data or prediction residual data, producing blocks of DCT coefficients. Alternatively, the frequency transformer (760) applies another conventional frequency transform such as a Fourier transform or uses wavelet or subband analysis. In embodiments in which the encoder uses spatial extrapolation (not shown in FIG. 7) to encode blocks of key frames, the frequency transformer (760) can apply a re-oriented frequency transform such as a skewed DCT to blocks of prediction residuals for the key frame. In other embodiments, the frequency transformer (760) applies an 8×8, 8×4, 4×8, or other size frequency transforms (e.g., DCT) to prediction residuals for predicted frames.

A quantizer (770) then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (700) can use frame dropping, adaptive filtering, or other techniques for rate control.

If a given macroblock in a predicted frame has no information of certain types (e.g., no motion information for the macroblock and no residual information), the encoder (700) may encode the macroblock as a skipped macroblock. If so, the encoder signals the skipped macroblock in the output bitstream of compressed video information (795).

When a reconstructed current frame is needed for subsequent motion estimation/compensation, an inverse quantizer (776) performs inverse quantization on the quantized spectral data coefficients. An inverse frequency transformer (766) then performs the inverse of the operations of the frequency transformer (760), producing a reconstructed prediction residual (for a predicted frame) or a reconstructed key frame. If the current frame (705) was a key frame, the reconstructed key frame is taken as the reconstructed current frame (not shown). If the current frame (705) was a predicted frame, the reconstructed prediction residual is added to the motion-compensated current frame (735) to form the reconstructed current frame. The frame store (720) buffers the reconstructed current frame for use in predicting the next frame. In some embodiments, the encoder applies a deblocking filter to the reconstructed frame to adaptively smooth discontinuities in the blocks of the frame.

The entropy coder (780) compresses the output of the quantizer (770) as well as certain side information (e.g., motion information (715), spatial extrapolation modes, quantization step size). Typical entropy coding techniques include arithmetic coding, differential coding, Huffman coding, run length coding, LZ coding, dictionary coding, and combinations of the above. The entropy coder (780) typically uses different coding techniques for different kinds of information (e.g., DC coefficients, AC coefficients, different kinds of side information), and can choose from among multiple code tables within a particular coding technique.

The entropy coder (780) puts compressed video information (795) in the buffer (790). A buffer level indicator is fed back to bit rate adaptive modules.

The compressed video information (795) is depleted from the buffer (790) at a constant or relatively constant bit rate and stored for subsequent streaming at that bit rate. Therefore, the level of the buffer (790) is primarily a function of the entropy of the filtered, quantized video information, which affects the efficiency of the entropy coding. Alternatively, the encoder system (700) streams compressed video information immediately following compression, and the level of the buffer (790) also depends on the rate at which information is depleted from the buffer (790) for transmission.

Before or after the buffer (790), the compressed video information (795) can be channel coded for transmission over the network. The channel coding can apply error detection and correction data to the compressed video information (795).

B. Video Decoder

FIG. 8 is a block diagram of a general video decoder system (800). The decoder system (800) receives information (895) for a compressed sequence of video frames and produces output including a reconstructed frame (805). Particular embodiments of video decoders typically use a variation or supplemented version of the generalized decoder (800).

The decoder system (800) decompresses predicted frames and key frames. For the sake of presentation, FIG. 8 shows a path for key frames through the decoder system (800) and a path for forward-predicted frames. Many of the components of the decoder system (800) are used for compressing both key frames and predicted frames. The exact operations performed by those components can vary depending on the type of information being compressed.

A buffer (890) receives the information (895) for the compressed video sequence and makes the received information available to the entropy decoder (880). The buffer (890) typically receives the information at a rate that is fairly constant over time, and includes a jitter buffer to smooth short-term variations in bandwidth or transmission. The buffer (890) can include a playback buffer and other buffers as well. Alternatively, the buffer (890) receives information at a varying rate. Before or after the buffer (890), the compressed video information can be channel decoded and processed for error detection and correction.

The entropy decoder (880) entropy decodes entropy-coded quantized data as well as entropy-coded side information (e.g., motion information (815), spatial extrapolation modes, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (880) frequently uses different decoding techniques for different kinds of information (e.g., DC coefficients, AC coefficients, different kinds of side information), and can choose from among multiple code tables within a particular decoding technique.

If the frame (805) to be reconstructed is a forward-predicted frame, a motion compensator (830) applies motion information (815) to a reference frame (825) to form a prediction (835) of the frame (805) being reconstructed. For example, the motion compensator (830) uses a macroblock motion vector to find a macroblock in the reference frame (825). A frame buffer (820) stores previous reconstructed frames for use as reference frames. The motion compensator (830) can compensate for motion at pixel, ½ pixel, ¼ pixel, or other increments, and can switch the resolution of the motion compensation on a frame-by-frame basis or other basis. The resolution of the motion compensation can be the same or different horizontally and vertically. Alternatively, a motion compensator applies another type of motion compensation. The prediction by the motion compensator is rarely perfect, so the decoder (800) also reconstructs prediction residuals.

When the decoder needs a reconstructed frame for subsequent motion compensation, the frame store (820) buffers the reconstructed frame for use in predicting the next frame. In some embodiments, the encoder applies a deblocking filter to the reconstructed frame to adaptively smooth discontinuities in the blocks of the frame.

An inverse quantizer (870) inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer (860) converts the quantized, frequency domain data into spatial domain video information. For block-based video frames, the inverse frequency transformer (860) applies an inverse DCT ["IDCT"] or variant of IDCT to blocks of the DCT coefficients, producing pixel data or prediction residual data for key frames or predicted frames, respectively. Alternatively, the frequency transformer (860) applies another conventional inverse frequency transform such as a Fourier transform or uses wavelet or subband synthesis. In embodiments in which the decoder uses spatial extrapolation (not shown in FIG. 8) to decode blocks of key frames, the inverse frequency transformer (860) can apply a re-oriented inverse frequency transform such as a skewed IDCT to blocks of prediction residuals for the key frame. In other embodiments, the inverse frequency transformer (860) applies an 8×8, 8×4, 4×8, or other size inverse frequency transforms (e.g., IDCT) to prediction residuals for predicted frames.

When a skipped macroblock is signaled in the bitstream of information (895) for a compressed sequence of video frames, the decoder (800) reconstructs the skipped macroblock without using the information (e.g., motion information and/or residual information) normally included in the bitstream for non-skipped macroblocks.

III. First Implementation

In a first implementation, a video encoder and decoder encode and decode, respectively, skipped macroblock information with improved efficiency. The skipped macroblock information is signaled at the picture layer in the video bitstream, which allows the encoder to exploit redundancy in the skipped macroblock information. Also, the encoder and decoder select between multiple coding modes for encoding and decoding the skipped macroblock information.

A. Picture Layer Coding of Skipped Macroblock Information

In the first implementation, a compressed video sequence is made up of data structured into four hierarchical layers. From top to bottom the layers are: 1) sequence layer; 2) picture layer; 3) macroblock layer; and 4) block layer. At the picture layer, data for each picture consists of a picture header followed by data for the macroblock layer. (Similarly, at the macroblock layer, data for each macroblock consists of a macroblock header followed by the block layer.) While some of the bitstream elements for I pictures and P pictures are identical, others appear only in P pictures, and vice versa.

Figure 9:
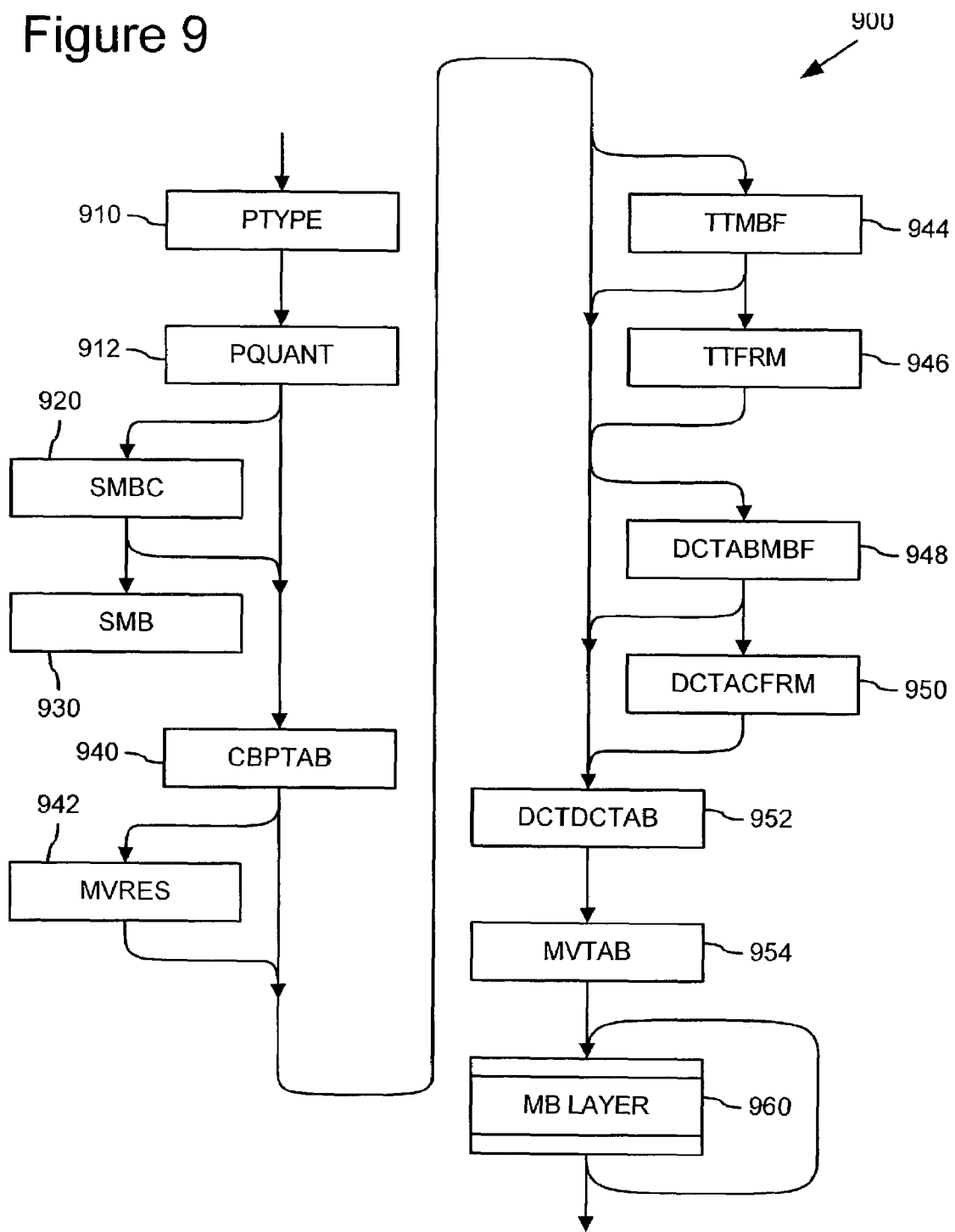
FIG. 9 is a chart showing the bitstream elements that make up the P picture layer according to the first implementation.

FIG. 9 shows the bitstream elements that make up the P-picture layer (900). Table 1 briefly describes the bitstream elements of the P-picture layer (900).

TABLE 1

Bitstream elements of the P-picture layer in first implementation

| Field | Description |
| --- | --- |
| PTYPE (910) | Picture type |
| PQUANT (912) | Picture quantizer scale |
| SMBC (920) | Skipped macroblock code |
| SMB (930) | Skipped macroblock field |

TABLE 1-continued

Bitstream elements of the P-picture layer in first implementation

| Field | Description |
| --- | --- |
| CPBTAB (940) | Coded block pattern table |
| MVRES (942) | Motion vector resolution |
| TTMBF (944) | Macroblock-level transform type flag |
| TTFRM (946) | Frame-level transform type |
| DCTACMBF (948) | Macroblock-level DCT AC coding set flag |
| DCTACFRM (950) | Frame-level DCT AC coding set index |
| DCTDCTAB (952) | Intra DCT DC table |
| MVTAB (954) | Motion vector table |
| MB LAYER (960) | Macroblock layer |

In particular, the P-picture layer (900) includes a Skipped Macroblock field ("SMB") (930) for the macroblocks in the P picture as well as a Skipped Macroblock Code ("SMBC") field (920) that signals the coding mode for the skipped macroblock field (930). The SMBC field (920) is present only in P-picture headers. SMBC (920) is a 2-bit value that signals one of four modes used for indicating the skipped macroblocks in the frame. In the first implementation, the fixed length codes ("FLCs") for the skipped macroblock coding modes are as follows:

TABLE 2

Skipped macroblock coding mode code table in first implementation

| SMBC FLC | Skipped Bit Coding Mode |
| --- | --- |
| 00 | No skipped bit coding |
| 01 | Normal skipped bit coding |
| 10 | Row-prediction (or, "row-skip") skipped bit coding |
| 11 | Column-prediction (or, "column-skip") skipped bit coding |

If the coding mode is normal, row-prediction, or column-prediction, then the next field in the bitstream is the SMB field (930) containing the skipped macroblock information. So, the SMB field is present only in P-picture headers and only if SMBC signals normal, row-prediction, or column-prediction skipped macroblock coding. If SMBC signals normal coding, then the size of the SMB field is equal to the number of macroblocks in the frame. If SMBC signals row-prediction or column-prediction, then the size of the SMB is variable as described below.

The skipped macroblock information informs the decoder as to which macroblocks in the frame are not present in the macroblock layer. For these macroblocks, the decoder will copy the corresponding macroblock pixel data from the reference frame when reconstructing that macroblock.

B. Switching Coding Modes for Skipped Macroblock Information

As described above, the SMBC field (920) signals the coding mode for the skipped macroblock field (930). More generally, FIG. 10 shows a technique (1000) for encoding skipped macroblock information in a video encoder having multiple skip-macroblock coding modes. FIG. 11 shows a corresponding technique (1100) for decoding skipped macroblock information encoded by a video encoder having plural skip-macroblock coding modes.

With reference to FIG. 10, the encoder selects a skip-macroblock coding mode for coding skipped macroblock information (1010). For example, in the first implementation, the skipped macroblock coding modes include a mode where no macroblocks are skipped, a normal mode, a row-prediction (or, "row-skip") mode, and a column-prediction (or "column-skip") mode. After the coding mode is selected, the encoder encodes the skipped macroblock information (1020). The encoder selects coding modes on a picture-by-picture basis. Alternatively, the encoder selects coding modes on some other basis (e.g., at the sequence level). When the encoder is done encoding the skipped macroblock information (1030), encoding ends.

With reference to FIG. 11, the decoder determines the skip-macroblock coding mode used by the encoder to encode the skipped macroblock information (1110). The decoder then decodes the skipped macroblock information (1120). The decoder determines coding modes on a picture-by-picture basis. Alternatively, the decoder determines coding modes on some other basis (e.g., at the sequence level). When the decoder is done decoding the skipped macroblock information (1130), decoding ends.

C. Coding Modes

In the first implementation, the skipped macroblock coding modes include a mode where no macroblocks are skipped, a normal mode, a row-prediction (or, "row-skip") mode, and a column-prediction (or "column-skip") mode. The following sections describe how skipped macroblock information is encoded in each mode with reference to FIG. 12, which shows an example (1200) of a skipped macroblock coding frame.

1. Normal Skipped Macroblock Coding Mode

In normal mode, the skipped/not-skipped status of each macroblock is represented with a bit. Therefore, the size of the SMB field in bits is equal to the number of macroblocks in the frame. The bit position within the SMB field corresponds to the raster scan order of the macroblocks within the frame starting with the upper-left macroblock. A bit value of 0 indicates that the corresponding macroblock is not skipped; a bit value of 1 indicates that the corresponding macroblock is skipped.

Figures 12, 13:
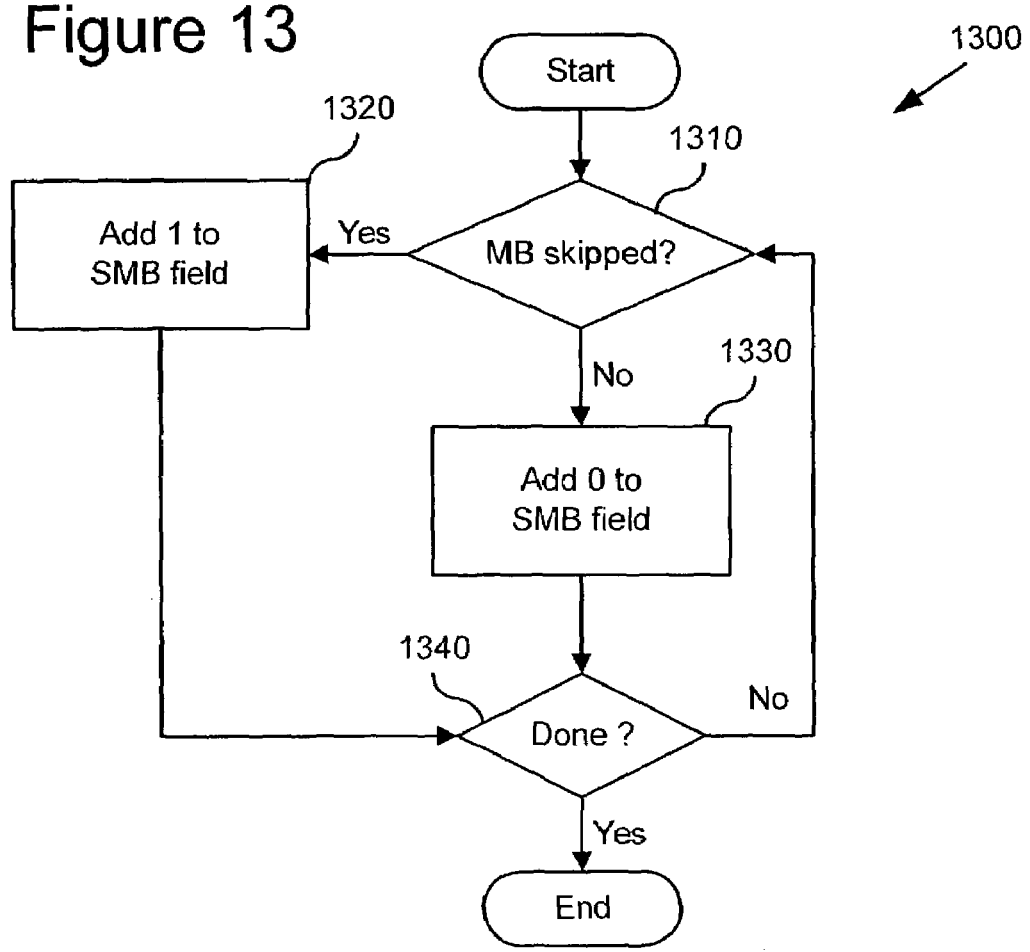
FIG. 12 shows an example of a skipped macroblock coding frame.
FIG. 13 is a flowchart showing a technique for encoding in normal skip-macroblock coding mode.

FIG. 13 shows a technique (1300) for encoding in normal skip-macroblock coding mode. First, the encoder checks whether coding of a macroblock will be skipped (1310). If so, the encoder adds a bit value of 1 to the SMB field to indicate that the corresponding macroblock is skipped (1320). Otherwise, the encoder adds a bit value of 0 to the SMB field to indicate that the corresponding macroblock is not skipped (1330). When the encoder is done adding bits to the SMB field (1340), skip macroblock coding ends.

As an example, using normal mode coding, the SMB field for the example frame (1200) in FIG. 12 would be encoded as: 0100101111111111111010010.

2. Row-prediction Skipped Macroblock Coding Mode

In row-prediction mode, the status of each macroblock row (from top to bottom) is indicated with a bit. If the bit is 1, then the row contains all skipped macroblocks and the status for the next row follows. If the bit equals 0, then the skipped/not skipped status for each macroblock in that row is signaled with a bit. Therefore, a bit field equal in length to the number of macroblocks in a row follows. The bits in the bit field represent the macroblocks in left-to-right order. Again, a value of 0 indicates that the corresponding macroblock is not skipped; a value of 1 indicates that the corresponding macroblock is skipped.

Figures 14, 15:
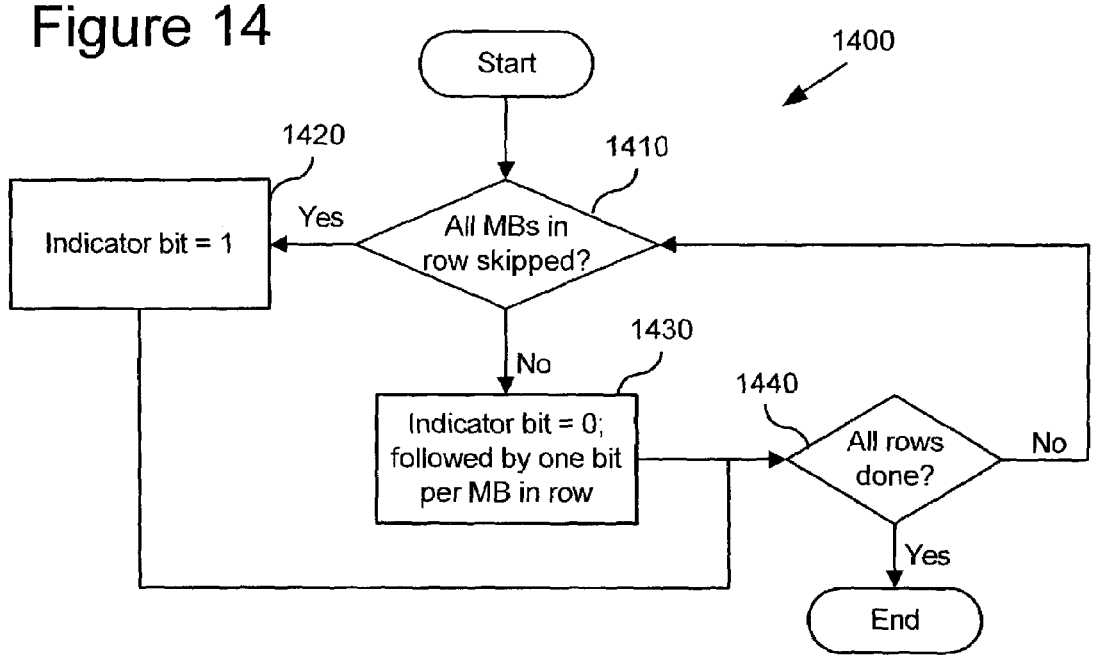
FIG. 14 is a flowchart showing a technique for encoding in a row-prediction skip-macroblock coding mode.
FIG. 15 is a code listing showing pseudo-code for row-prediction decoding of skipped macroblock information.

FIG. 14 shows a technique (1400) for encoding in row-prediction (or, "row-skip") macroblock coding mode. First, the encoder checks if a row contains all skipped macroblocks (1410). If so, the encoder adds an indicator bit of 1 to the SMB field (1420) and the status for the next row follows. If the row does not contain all skipped macroblocks, the encoder adds an indicator bit of 0 to the SMB field, and the skipped/not-skipped status for each macroblock in that row is signaled with a bit (1430). When the encoder is done with all the rows in the frame (1440), the row-prediction encoding ends.

As for decoding, FIG. 15 shows pseudo-code (1500) illustrating row-prediction decoding of the skipped macroblock information. In the pseudo-code (1500), the function get_bits(n) reads n bits from the bitstream and returns the value.

As an example, using row-prediction mode coding, the SMB field for the example frame (1200) in FIG. 12 would be encoded as: 0010010110010010.

3. Column-prediction Skipped Macroblock Coding Mode

In column-prediction mode, the status of each macroblock column (from left to right) is indicated with a bit. If the bit is 1, then the column contains all skipped macroblocks and the status for the next column follows. If the bit equals 0, then the skipped/not skipped status for each macroblock in that column is signaled with a bit. Therefore, a bit field equal in length to the number of macroblocks in a column follows. The bits in the bit field represent the macroblocks in top-to-bottom order. Again, a value of 0 indicates that the corresponding macroblock is not skipped; a value of 1 indicates that the corresponding macroblock is skipped.

Figures 16, 17:
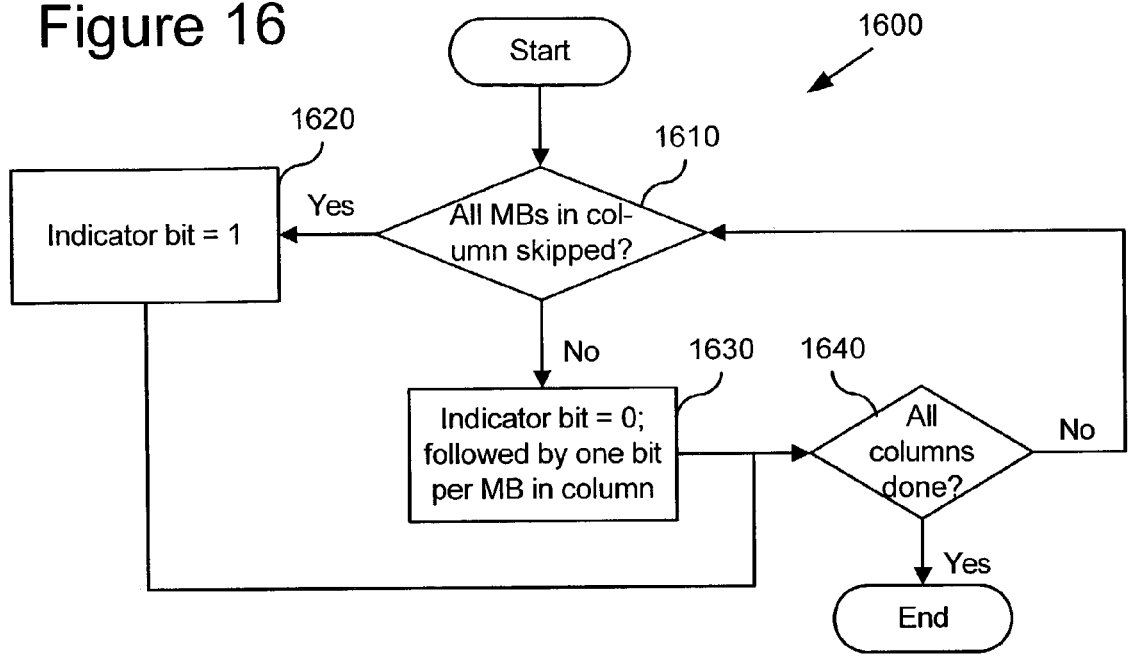
FIG. 16 is a flowchart showing a technique for encoding in a column-prediction skip-macroblock coding mode.
FIG. 17 is a code listing showing pseudo-code for column-prediction decoding of skipped macroblock information.

FIG. 16 shows a technique (1600) for encoding in column-prediction (or, "column-skip") macroblock coding mode. First, the encoder checks if the column contains all skipped macroblocks (1610). If so, the encoder adds an indicator bit of 1 to the SMB field (1620) and the status for the next column follows. If the column does not contain all skipped macroblocks, the encoder adds an indicator bit of 0 to the SMB field, and the skipped/not-skipped status for each macroblock in that column is signaled with a bit (1630). When the encoder is done with all the columns in the frame (1640), the column-prediction encoding ends.

As for decoding, FIG. 17 shows pseudo-code (1700) illustrating column-prediction decoding of the skipped macroblock information.

As an example, using column-prediction mode coding, the SMB field for the example frame (1200) in FIG. 12 would be encoded as: 0011010011000110100110.

IV. Second Implementation

In a second implementation, a video encoder and decoder encode and decode, respectively, skipped macroblock information and/or other 2-D binary data with improved efficiency. The encoder and decoder define a skipped macroblock as having a default motion (not necessarily zero motion), which allows the encoder and decoder to skip more macroblocks in many cases. Efficient frame-level coding of bit planes indicates skipped macroblock information and/or other 2-D binary data. Also, the encoder and decoder may use a raw (MB-level) coding option of skipped macroblocks for low-latency applications.

A. Skip Bit Definition (Definition of Skipped Macroblock)

The second implementation includes a new definition of the concept of a skipped macroblock. "Skip" refers to a condition in a bitstream where no further information needs to be transmitted at that level of granularity. A skipped macroblock (block) is a macroblock (block) that has a default type, default motion, and default residual error. (In comparison, in other implementations and standards, skipped macroblocks are predicted macroblocks with zero motion and zero residuals.

The new definition of skipped macroblock is a predicted macroblock whose motion is equal to its causally predicted motion, and which has zero residual error. (The point of difference from the other definition is the default motion is equal to the motion predictor, and this may not necessarily be zero.)

For example, in some embodiments, predicted motion vectors for a current macroblock are taken from the macroblock directly above or directly to the left of the current macroblock. Or, horizontal and vertical components of the predictor are generated from the horizontal and vertical component-wise medians of the macroblocks the left, top, and top right of the current macroblock.

The motion vectors of a skipped macroblock with four motion vectors (4MV) are given by their predictions performed sequentially in the natural scan order. As with the one motion vector (1MV) case, the error residuals are zero.

Figure 18:
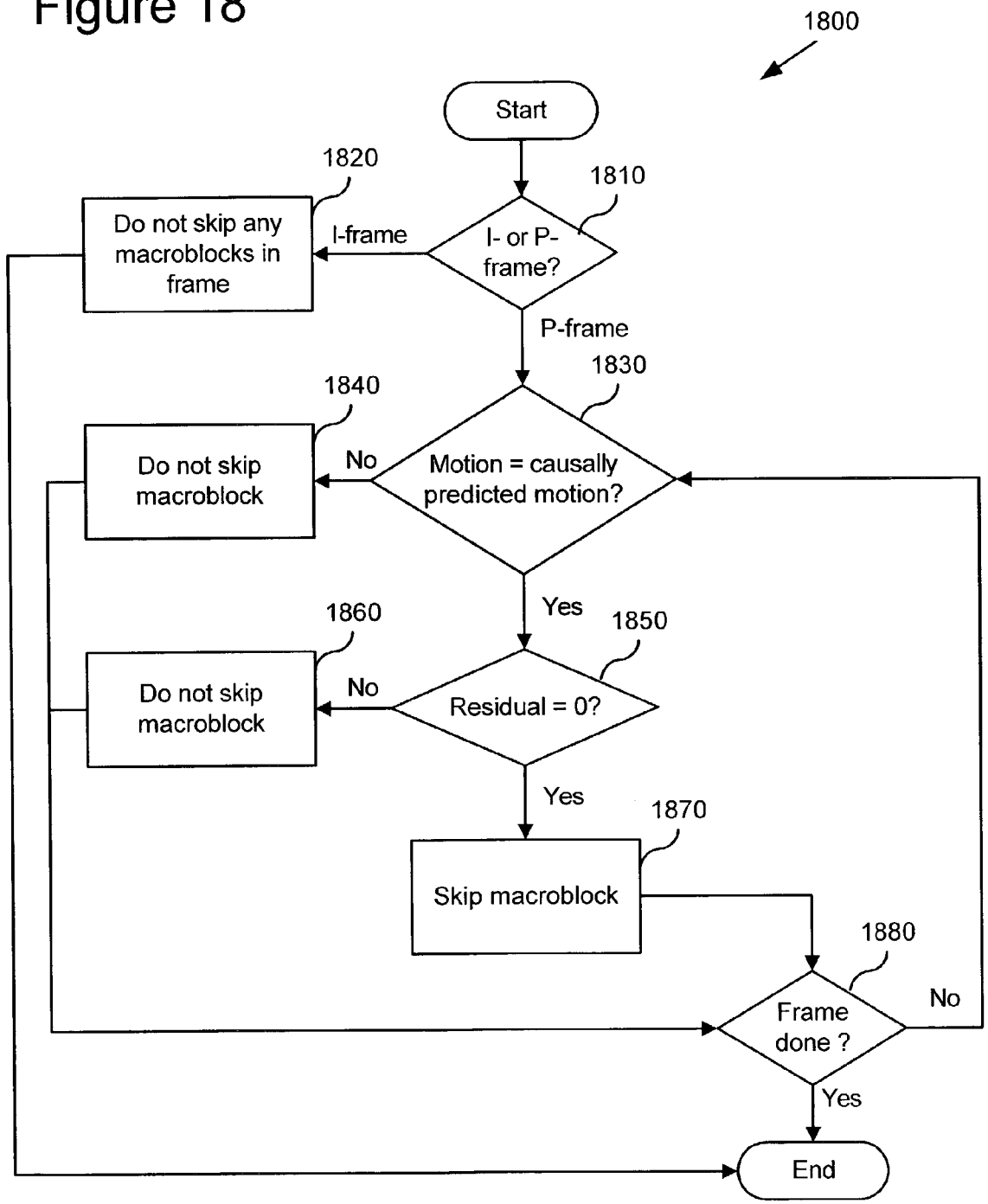
FIG. 18 is a flowchart showing a technique for determining whether to skip coding of certain macroblocks in a video encoder.

FIG. 18 shows a technique (1800) for determining whether to skip coding of particular macroblocks in a video encoder according to the new definition of skipped macroblocks. First, the encoder checks whether the current frame is an I-frame or a P-frame (1810). If the current frame is an I-frame, no macroblocks in the current frame are skipped (1820), and skip-macroblock coding for the frame ends.

On the other hand, if the current frame is a P-frame, the encoder checks for macroblocks in the current frame that can be skipped. For a given macroblock, the encoder checks whether the motion vector for the macroblock is equal to the causally predicted motion vector for the macroblock (e.g., whether the differential motion vector for the macroblock is equal to zero) (1830). If the motion for a macroblock does not equal the causally predicted motion, the encoder does not skip the macroblock (1840). Otherwise, the encoder checks whether there is any residual to be encoded for the macroblock (1850). If there is a residual to be coded, the encoder does not skip the macroblock (1860). If there is no residual for the macroblock, however, the encoder skips the macroblock (1870). The encoder continues to encode or skip macroblocks until encoding is done (1880).

B. Bit Plane Coding

In the second implementation, certain macroblock-specific information (including signaling skipped macroblocks) can be encoded in one bit per macroblock. The status for all macroblocks in a frame can be coded together as a bit plane and transmitted in the frame header.

In the second implementation, the encoder uses bit plane coding in three cases to signal information about macroblocks in a frame. The three cases are: 1) signaling skipped macroblocks, 2) signaling field or frame macroblock mode, and 3) signaling 1-MV or 4-MV motion vector mode for each macroblock. This section describes bit plane coding for any of the three cases and corresponding decoding.

Frame-level bit plane coding is used to encode two-dimensional binary arrays. The size of each array is rowMB×colMB, where rowMB and colMB are the number of macroblock rows and columns, respectively. Within the bitstream, each array is coded as a set of consecutive bits. One of seven modes is used to encode each array, as enumerated in Table 3 and described below.

TABLE 3

Coding modes in second implementation

| Coding Mode | Description |
| --- | --- |
| Raw | Coded as one bit per symbol |
| Normal-2 | Two symbols coded jointly |
| Diff-2 | Differential coding of bit plane, followed by coding two residual symbols jointly |
| Normal-6 | Six symbols coded jointly |
| Diff-6 | Differential coding of bit plane, followed by coding six residual symbols jointly |
| Row-skip | One bit skip to signal rows with no set bits. |
| Column-skip | One bit skip to signal columns with no set bits. |

In the second implementation, the encoder uses three syntax elements to embed the information in a bit plane: MODE, INVERT and DATABITS.

The MODE field is a variable length code ("VLC") that encodes the coding mode for the bit plane. For example, the VLC in the MODE field represents any of the seven coding modes enumerated in Table 3. To save bits, the encoder can assign shorter codes to more probable coding modes and longer codes to less probable coding modes. As noted above, the MODE field is transmitted in the frame header.

The encoder and decoder switch between coding modes on a frame-by-frame basis. For example, the encoder and decoder switch between coding modes as like the encoder and decoder of the first implementation switch between skipped macroblock coding modes in FIGS. 10 and 11, respectively. Alternatively, the encoder and decoder switch using some other technique and/or on some other basis.

If the mode is not raw mode, the one bit INVERT field is sent. In several coding modes where conditional inversion may be performed, the INVERT field indicates whether the bits in the bit plane are to be inverted before encoding takes place in the encoder and whether the output of decoding in the decoder is to be inverted. The INVERT field is 1 when most of the bits in the bit plane are equal to 1, and 0 when most of the bits in the bit plane are equal to 0. The encoder employs several coding modes (such as normal-2 and normal-6) that consume less bits when more 0s are present. If the bit plane to be encoded has more 1s than 0s, the encoder can invert the bit plane to increase the proportion of 0s in the bit plane and increase the potential for bit savings. Other modes (such as diff-2 and diff-6) use the value of the INVERT to calculate a predictor bit plane. Therefore, in some coding modes, the final bit plane reconstructed at the decoder depends on INVERT.

The DATABITS field is an entropy coded stream of VLC symbols containing the information necessary to reconstruct the bit plane, given the MODE and INVERT fields.

C. Coding Modes

In the second implementation, the encoder encodes binary information (e.g., skipped macroblock information) in any of seven different coding modes: row-skip mode, column-skip mode, normal-2 mode, normal-6 mode, diff-2 mode, diff-6 mode, and raw mode. A decoder performs corresponding decoding for any of the seven coding modes. Each mode is described in detail below.

Alternatively, the encoder and decoder use other and/or additional coding modes.

1. Row-skip and Column-skip Modes

The row-skip coding mode saves bits by representing a row in a bit plane with a single bit if each binary symbol in the row is of a certain value. For example, the encoder represents a skipped macroblock with a 0 in a bit plane, and uses a row-skip coding mode that represents a row of all 0s with a single bit. The encoder therefore saves bits when entire rows of macroblocks are skipped. The decoder performs corresponding decoding.

In the second implementation, all-zero rows are indicated using one bit set to 0. When the row is not all zero, the one bit indicator is set to 1, and this is followed by colMB bits containing the bit plane row in order. Rows are scanned in the natural order.

Likewise, for the column-skip mode, if the entire row is zero, a 0 bit is sent. Else, a 1 is sent, followed by the rowMB bits containing the entire column, in order. Columns are scanned in the natural order.

For coding of leftover rows and/or columns in diff-6 and normal-6 modes (described below), the same logic is applied. A one-bit flag indicates whether the row or column is all zero. If not, the entire row or column is transmitted using one bit per symbol.

When the encoder encodes a bit plane consisting primarily of is, row-skip and column-skip coding are usually less efficient, because of the lower probability that rows/columns will consist entirely of 0s. However, the encoder can perform an inversion on the bit plane in such a situation to increase the proportion of 0s and potentially increase bit savings. Thus, when conditional inversion is indicated through the INVERT bit, the encoder pre-inverts the bit plane before the bit plane is tiled and coded. On the decoder side, conditional inversion is implemented by taking the inverse of the final output. (This is not performed for the diff-2 and diff-6 mode.)

Figure 19:
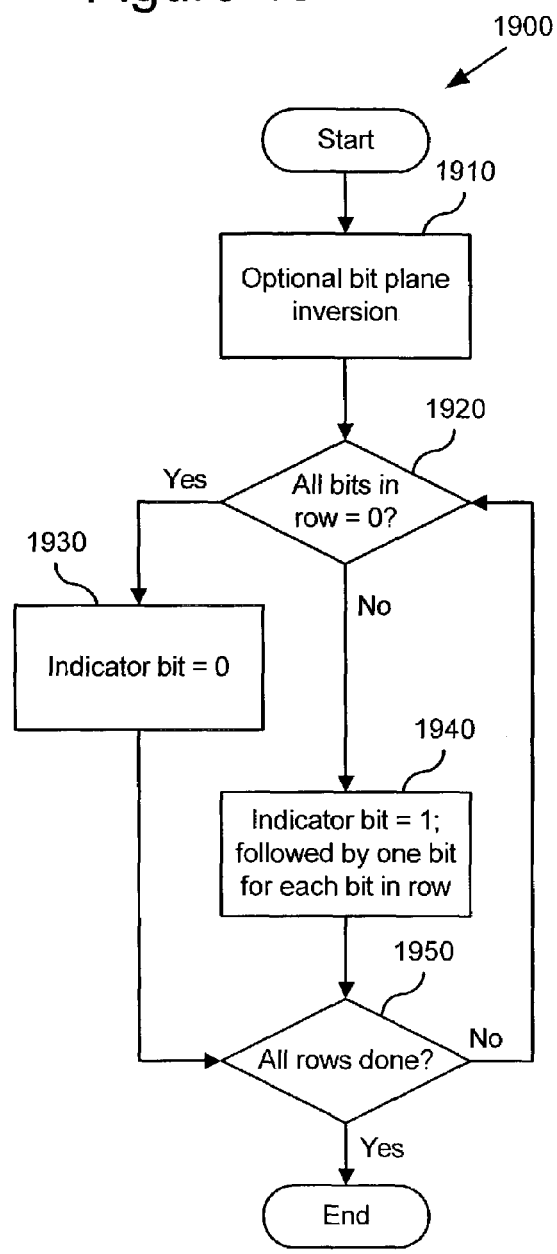
FIG. 19 is a flowchart showing a technique for encoding binary information in a bit plane in a row-skip coding mode.

FIG. 19 shows a technique (1900) for encoding binary information in a bit plane in a row-skip coding mode. The encoder first checks whether inversion of the bit plane is appropriate, and, if so, performs the inversion (1910). The encoder then checks a row in the bit plane to see if each bit in the row is equal to 0 (1920). If so, the encoder sets the indicator bit for the row to 0 (1930). If any of the bits in the row are not 0, the encoder sets the indicator bit for the row to 1 and encodes each bit in the row with one bit (1940). When the encoder is done encoding all rows in the bit plane (1950), encoding of the bit plane ends.

A decoder performs corresponding decoding for the row-skip coding mode.

Figure 20:
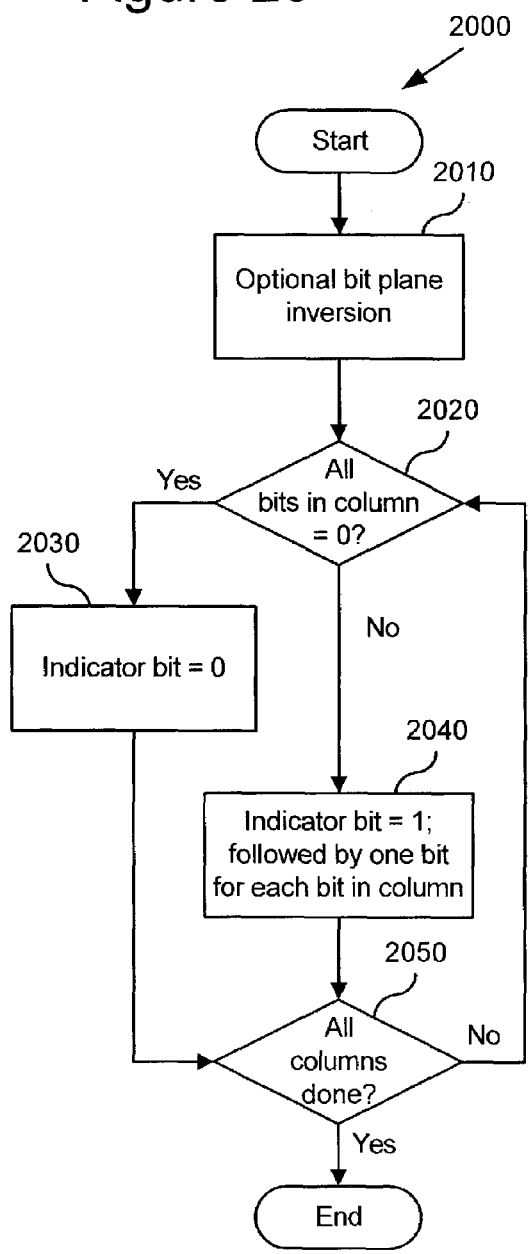
FIG. 20 is a flowchart showing a technique for encoding binary information in a bit plane in a column-skip coding mode.

FIG. 20 shows a technique for encoding binary information in a column-skip coding mode. The encoder first checks whether inversion of the bit plane is appropriate, and, if so, performs the inversion (2010). The encoder then checks a column in the bit plane to see if each bit in the column is equal to 0 (2020). If so, the encoder sets the indicator bit for the column to 0 (2030). If any of the bits in the column are not 0, the encoder sets the indicator bit for the column to 1 and encodes each bit in the column with one bit (1940). When the encoder is done encoding all columns in the bit plane (1950), encoding of the bit plane ends.

A decoder performs corresponding decoding for the column-skip coding mode.

2. Normal-2 Mode

The encoder uses the normal-2 mode to jointly encode plural binary symbols in a bit plane (e.g., by using a vector Huffman or other variable length encoding scheme). The encoder encodes pairs of binary symbols with variable length codes. The decoder performs corresponding decoding.

If rowMB×colMB is odd, the first symbol is encoded as a single bit. Subsequent symbols are encoded pairwise, in natural scan order. A VLC table is used to encode the symbol pairs to reduce overall entropy.

When conditional inversion is indicated through the INVERT bit, the encoder pre-inverts the bit plane before the bit plane is coded pairwise. On the decoder side, conditional inversion is implemented by taking the inverse of the final output. (When the diff-2 mode is used, conditional inversion is not performed at this step.)

Figure 21:
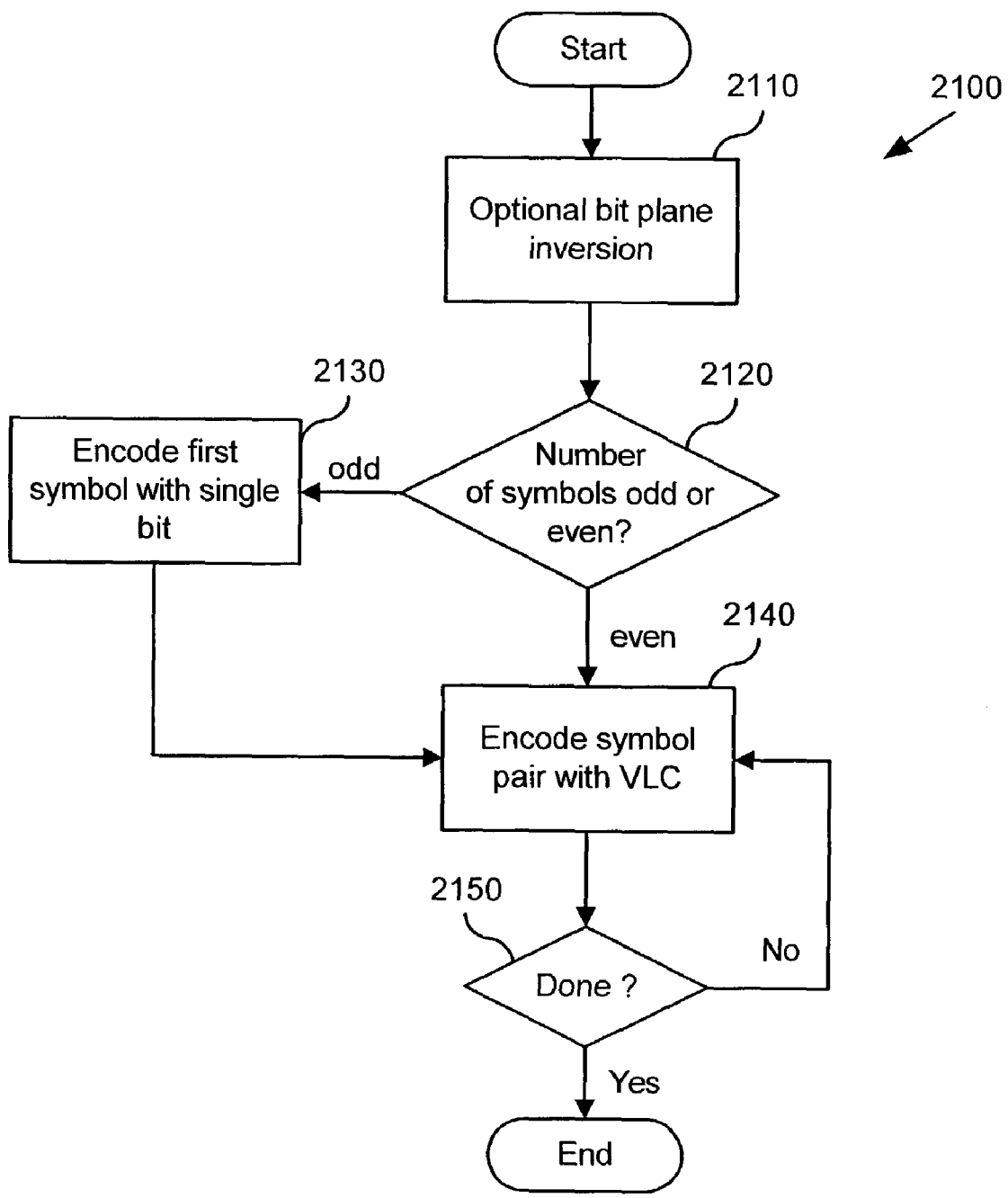
FIG. 21 is a flowchart showing a technique for encoding binary information in a bit plane in a normal-2 coding mode.

FIG. 21 shows a technique (2100) for encoding binary information in normal-2 mode. The encoder performs an initial check to determine whether inversion of the bit plane is appropriate to improve coding efficiency and, if so, performs the inversion (2110). The encoder then determines whether the bit plane being coded has an odd number of binary symbols (2120). If so, the encoder encodes the first symbol with a single bit (2130). The encoder then encodes symbol pairs with variable length codes, using shorter codes to represent more probable pairs and longer codes to represent less probable pairs (2140). When encoding of the symbol pairs is done (2150), the encoding ends.

A decoder performs corresponding decoding for the normal-2 coding mode.

3. Normal-6 Mode

The encoder also uses the normal-6 mode to jointly encode plural binary symbols in a bit plane (e.g., by using a vector Huffman or other variable length encoding scheme). The encoder tiles groups of six binary symbols and represents each group with a variable length code. The decoder performs corresponding decoding.

In the normal-6 mode (and the diff-6 mode), the bit plane is encoded in groups of six pixels. These pixels are grouped into either 2×3 or 3×2 tiles. The bit plane is tiled maximally using a set of rules, and the remaining pixels are encoded using variants of row-skip and column-skip modes.

Figure 22:
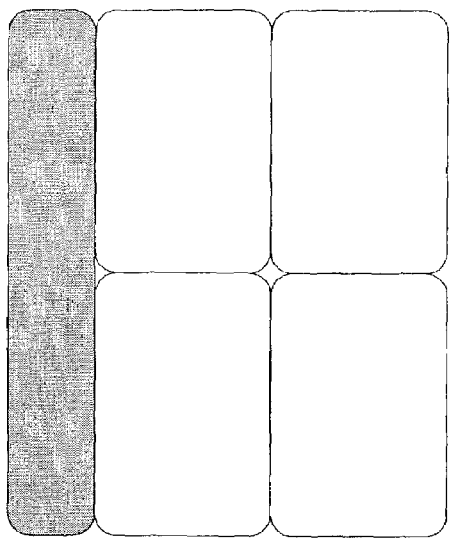
FIGS. 22, 23 and 24 show examples of frames of binary information tiled in normal-6 mode.
Figure 23:
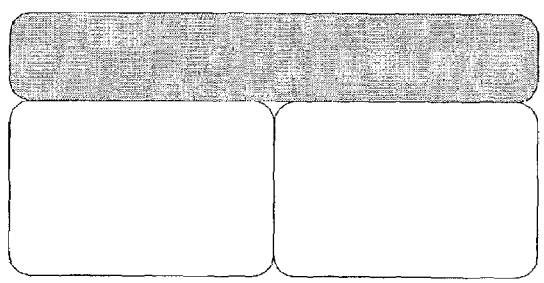
Figure 24:
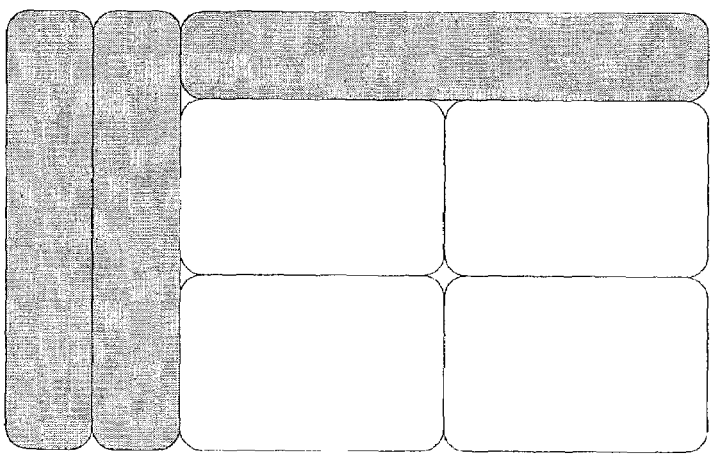

In the second implementation, 3×2 "vertical" tiles are used if and only if rowMB is a multiple of 3 and colMB is not a multiple of 3. Otherwise, 2×3 "horizontal" tiles are used. FIGS. 22, 23 and 24 show examples of frames tiled in the normal-6 coding mode. FIG. 22 shows a frame (2200) with 3×2 vertical tiles and a 1-symbol wide remainder (shown as a shaded area) to be coded in column-skip mode. FIG. 23 shows a frame (2300) with 2×3 horizontal tiles and a 1-symbol wide remainder to be coded in row-skip mode. FIG. 24 shows a frame (2400) with 2×3 horizontal tiles and 1-symbol wide remainders to be coded in row-skip and column-skip modes.

While 3×2 and 2×3 tiles are used in this example, in other embodiments, different configurations of tiles and/or different tiling rules are used.

The 6-element tiles are encoded first, followed by the column-skip and row-skip encoded linear tiles. If the array size is a multiple of 3×2 or 2×3, the latter linear tiles do not exist and the bit plane is perfectly tiled. The 6-element rectangular tiles are encoded using a VLC table.

When conditional inversion is indicated through the INVERT bit, the encoder pre-inverts the bit plane before the bit plane is tiled and coded. On the decoder side, conditional inversion is implemented by taking the inverse of the final output. (When the diff-6 mode is used, conditional inversion is not performed at this step.)

Figure 25:
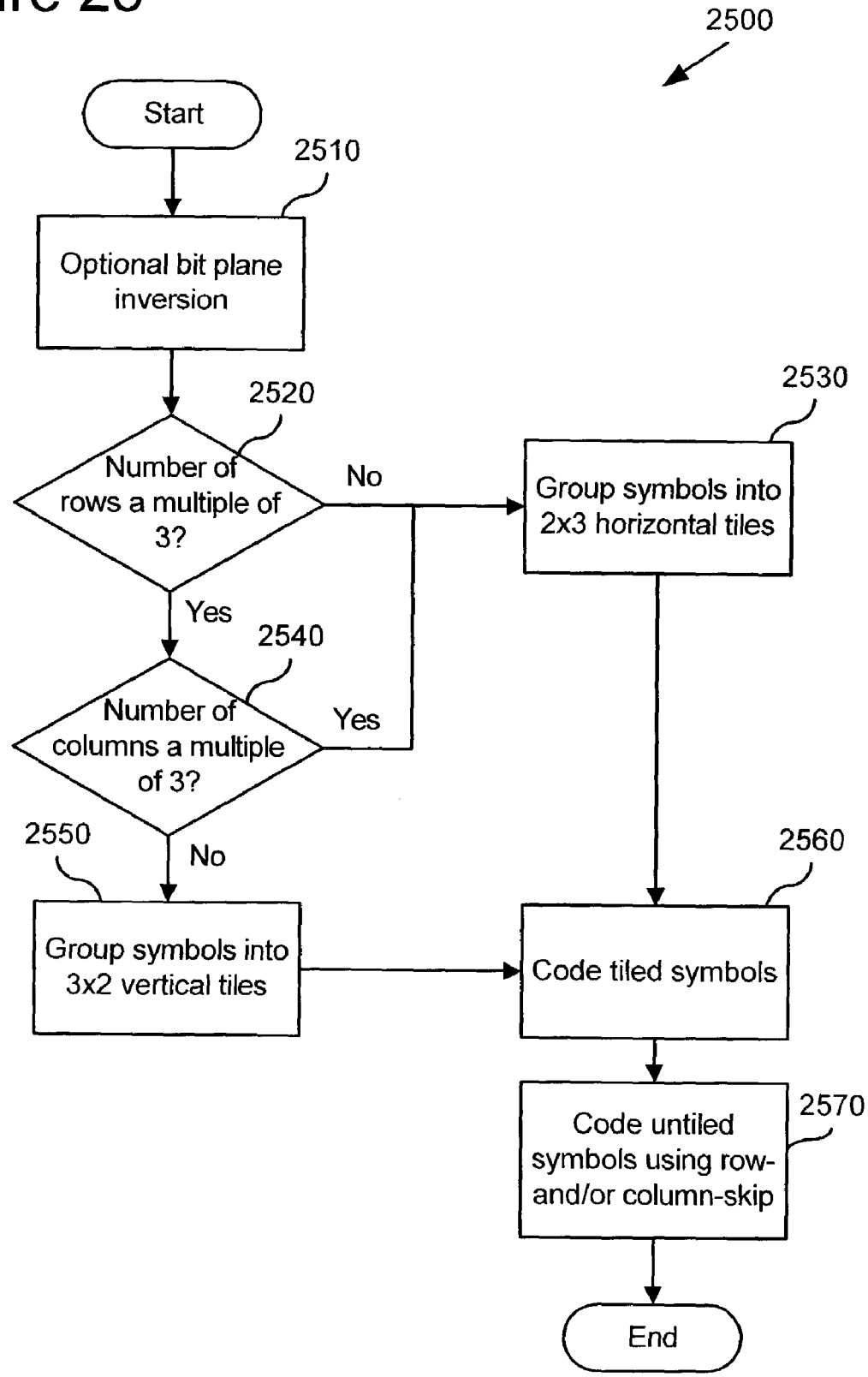
FIG. 25 is a flowchart showing a technique for encoding binary information in a bit plane in a normal-6 coding mode.

FIG. 25 shows a technique (2500) for encoding binary information in normal-6 mode. The encoder performs an initial check to determine whether inversion of the bit plane is appropriate to improve coding efficiency and, if so, performs the inversion (2510). The encoder then checks whether the number of rows in the bit plane is a multiple of three (2520). If the number of rows is not a multiple of three, the encoder groups the symbols in the bit plane into 2×3 horizontal tiles (2530).

If the number of rows is a multiple of three, the encoder checks whether the number of columns in the bit plane is a multiple of three (2540). If the number of columns is a multiple of three, the encoder groups the symbols in the bit plane into 2×3 horizontal tiles (2530). If the number of columns is not a multiple of three, the encoder groups the symbols into 3×2 vertical tiles (2550).

After grouping symbols into 3×2 or 2×3 tiles, the encoder encodes the groups of six tiled symbols using a technique such as a six-dimension vector Huffman coding technique or some other coding technique (2560). The encoder encodes any remaining untiled symbols using the row-skip and/or column-skip coding techniques described above (2570).

A decoder performs corresponding decoding for the normal-6 coding mode.

In other embodiments, an encoder uses other techniques to code the tiled and untiled symbols.

4. Diff-2 and Diff-6 Modes

Differential coding modes such as diff-2 or diff-6 mode encode bit planes by first generating a bit plane of differential (or residual) bits for the bit plane to be coded, based on a predictor for the bit plane to be coded. The residual bit plane is then encoded using, for example, the normal-2 or normal-6 coding mode, without conditional inversion.

In the second implementation, the diff-2 and diff-2 modes employ differential coding denoted by the operation diff. If either differential mode is used, a bit plane of differential bits is first generated by examining the predictor $\hat{b}(i,j)$ of the bit plane b(i,j), which is defined as the causal operation:

$$\hat{b}(i,j) = \begin{cases} \text{INVERT} & i = j = 0, \text{ or } b(i, j-1) \neq b(i-1, j) \\ b(0, j-1) & i = 0 \\ b(i-1, j) & \text{otherwise} \end{cases} \quad (1)$$

In other words, the predictor $\hat{b}(i,j)$ of a given binary symbol b(i,j) will be the binary symbol just to the left b(i−1,j) except in the following special cases:

1) If b(i,j) is at the top left corner of the bit plane, or if the above binary symbol b(i,j−1) is not equal to the binary symbol to the left b(i−1,j), the predictor $\hat{b}(i,j)$ is equal to the value of INVERT; or 2) If 1) does not apply and b(i,j) is in the left column (i==0), the predictor $\hat{b}(i,j)$ will be the above binary symbol b(i,j−1).

On the encoder side, the diff operation computes the residual bit plane r according to:

$$r(i,j) = b(i,j) \oplus \hat{b}(i,j) \quad (2),$$

where ⊕ is the exclusive or operation. The residual bit plane is encoded using the normal-2 or normal-6 modes with no conditional inversion.

On the decoder side, the residual bit plane is regenerated using the appropriate normal mode. Subsequently, the residual bits are used to regenerate the original bit plane as the binary 2-D difference:

$$b(i,j) = r(i,j) \oplus \hat{b}(i,j) \quad (3).$$

Figure 26:
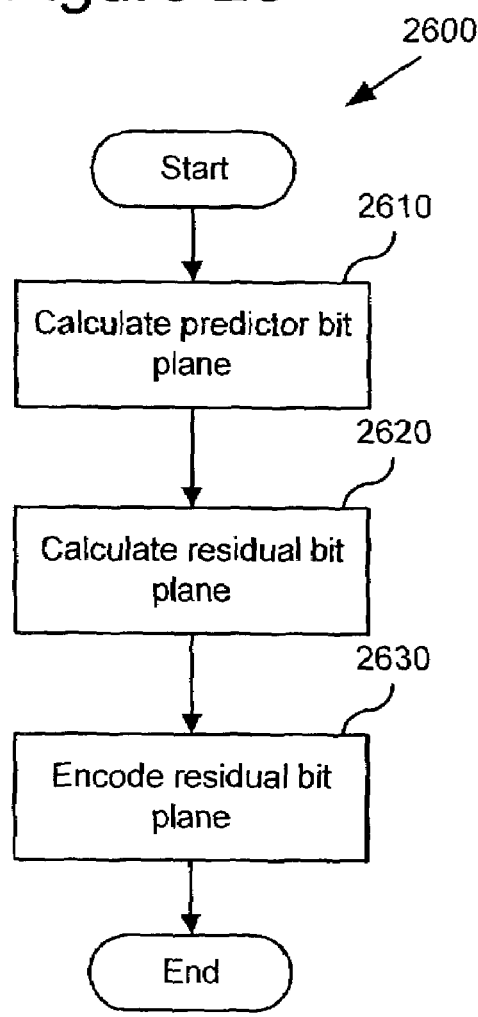
FIG. 26 is a flowchart showing a technique for encoding binary information in a differential coding mode.

FIG. 26 shows a technique (2600) for encoding binary information in a differential coding mode. The encoder calculates a predictor for a bit plane (2610), for example, as shown in equation 1. The encoder then calculates a residual bit plane, for example, by performing an XOR operation on the bit plane and its predictor (2620). The encoder then encodes the residual bit plane (e.g., in normal-2 or normal-6 mode) (2630).

Figure 27:
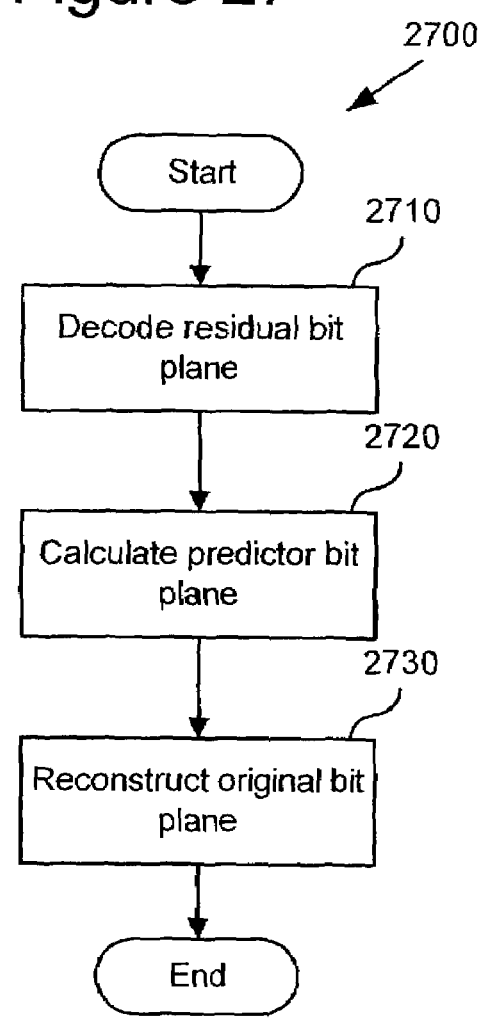
FIG. 27 is a flowchart showing a technique for decoding binary information encoded in a differential coding mode.

FIG. 27 shows a technique (2700) for decoding binary information encoded in a differential coding mode. The decoder decodes the residual bit plane (2710) using an appropriate decoding technique, based on the mode used to encode the residual bit plane (e.g., normal-2 or normal-6 mode). The decoder also calculates the predictor for the bit plane (2720), using the same technique used in the encoder. The decoder then reconstructs the original bit plane, for example, by performing an XOR operation on the decoded residual bit plane and the predictor bit plane (2730).

5. Raw Mode

All modes except for raw mode encode a bit plane at the frame level, which calls for a second pass through the frame during encoding. However, for low-latency situations, the second pass can add unacceptable delay (e.g., because transmission of the frame header and macroblock layer information is delayed until the last macroblock in the frame is reached, because of the time spent encoding the bit plane).

The raw mode uses the traditional method of encoding the bit plane one bit per binary symbol at the same location in the bitstream as the rest of the macroblock level information. Although macroblock-level coding of symbols is not a new concept by itself, switching the coding of symbols from frame level to macroblock level provides a low latency alternative to frame-level coding.

Figure 28:
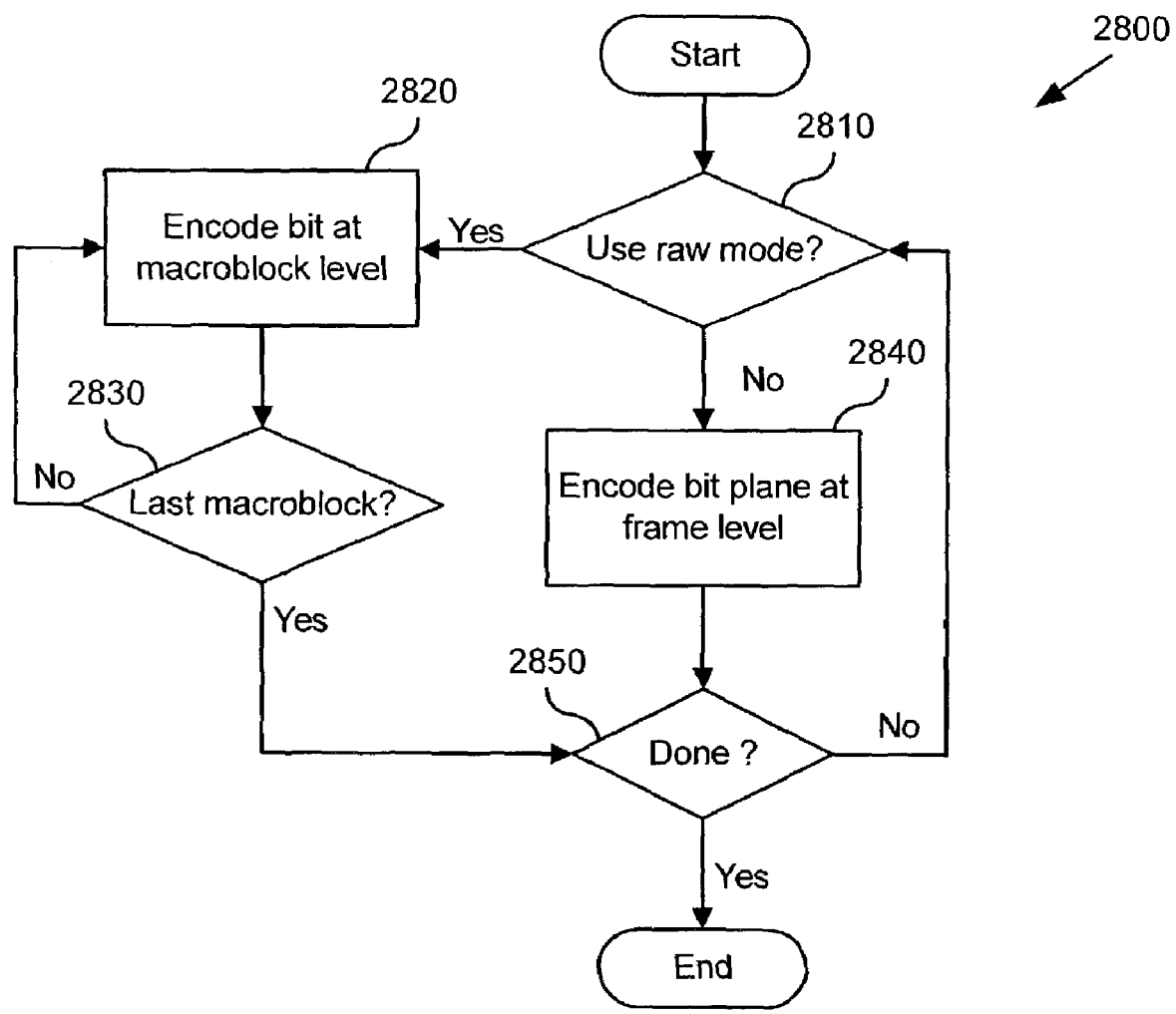
FIG. 28 is a flowchart showing a technique for selectively encoding binary information in raw coding mode for low latency applications.

FIG. 28 shows a technique (2800) for selectively encoding binary information for a macroblock in raw coding mode for low latency applications. First, the encoder checks whether to use raw mode to encode the binary information (2810). If so, the encoder encodes a bit at the macroblock level for a macroblock (2820) and checks whether the macroblock is the last macroblock in the frame (2830). If the macroblock is not the last macroblock in the frame, the encoder continues by encoding a bit for the next macroblock at the macroblock level (2820).

If the encoder does not use the raw coding mode, the encoder encodes a bit plane at the frame level for the macroblocks in the frame (2840). When the encoding of the macroblocks in the frame is done (2850), the encoding ends for the frame.

While the technique (2800) shows switching modes on a frame-by-frame basis, alternatively the encoder switches on some other basis.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. In a computer system, a computer-implemented method of compressing a bit plane comprising binary Symbols in a matrix arranged in rows or columns, the method comprising:
for each row in the bit plane where each binary symbol in the row is equal to a first value, or for each column in the bit plane where each binary symbol in the column is equal to a first value, encoding the row or column with a single bit in an encoded bit stream; and
for each row in the bit plane where at least one binary symbol in the row is not equal to the first value, or for each column in the bit plane where at least one binary symbol in the column is not equal to the first value, encoding the row or column with one bit per binary symbol in the row or column; and
outputting results of the encoding;
wherein the binary symbols in the matrix represent skipped macroblock information in a video sequence.

2. A computer-readable medium storing computer-executable instructions for causing the computer system to perform the method of claim 1 during video encoding.

3. The method of claim 1 wherein the binary symbols in the matrix represent 1-motion vector/4-motion vector decision information for macroblocks in P pictures in a video sequence.

4. The method of claim 1 wherein the binary symbols in the matrix represent interlace mode information for macroblocks in a video sequence.

* * * * *